(12) United States Patent
Coors

(10) Patent No.: US 12,457,133 B2
(45) Date of Patent: Oct. 28, 2025

(54) ULTRA WIDE BAND BASED ZONE DETERMINATION SYSTEM

(71) Applicant: Robert Bosch GmbH, Stuttgart (DE)

(72) Inventor: Martin Coors, Sunnyvale, CA (US)

(73) Assignee: Robert Bosch GmbH (DE)

( * ) Notice: Subject to any disclaimer, the term of this patent is extended or adjusted under 35 U.S.C. 154(b) by 57 days.

(21) Appl. No.: 18/378,383

(22) Filed: Oct. 10, 2023

(65) Prior Publication Data

US 2025/0119321 A1    Apr. 10, 2025

(51) Int. Cl.
  *H04L 23/02*   (2006.01)
  *H04L 5/00*    (2006.01)
  *H04L 25/02*   (2006.01)
  *H04W 64/00*   (2009.01)

(52) U.S. Cl.
  CPC ........ *H04L 25/0212* (2013.01); *H04L 5/0064* (2013.01); *H04W 64/003* (2013.01)

(58) Field of Classification Search
  CPC . H04B 1/7115; H04B 1/7163; H04L 25/0212; H04L 63/065; G01S 13/765; H04W 12/037; H04W 12/06
  USPC ......................................... 375/262, 260, 267
  See application file for complete search history.

(56) References Cited

U.S. PATENT DOCUMENTS

| | | | |
|---|---|---|---|
| 2020/0294401 A1* | 9/2020 | Kerecsen | G08G 1/205 |
| 2021/0396832 A1 | 12/2021 | McLaughlin et al. | |
| 2022/0164492 A1* | 5/2022 | Santarone | G06F 30/13 |
| 2023/0379702 A1* | 11/2023 | Alemdar | H04W 12/06 |
| 2024/0077574 A1* | 3/2024 | Joo | G01S 7/021 |
| 2024/0385309 A1* | 11/2024 | Verso | G01S 13/79 |
| 2025/0039647 A1* | 1/2025 | Bollard | G01S 1/24 |

OTHER PUBLICATIONS

Bernhard Großwindhager et al., "SnapLoc: An Ultra-Fast UWB-Based Indoor Localization System for an Unlimited Number of Tags." 18th International Conference on Information Processing in Sensor Networks (co-located with CPS-IoT Week 2019) (IPSN '19), Apr. 16-18, 2019, Montreal, QC, Canada. ACM, New York, NY, USA, 12 pages.

(Continued)

*Primary Examiner* — Khai Tran
(74) *Attorney, Agent, or Firm* — Dickinson Wright PLLC

(57) ABSTRACT

A system includes one or more ultra-wideband (UWB) transmit apparatuses configured to communicate an UWB signal that encodes radio packets that includes at least a preamble and a start frame delimiter (SFD) enabling a receiver to recover a reception timestamp and a channel impulse response (CIR) of the transmission, wherein the one or more UWB transmit apparatuses are located in a fixed position and configured to divide a space into a plurality of subspaces configured to be assigned an attribute associated with the subspaces, including one or more UWB receivers configured to extract CIR information from the one or more radio packets received from a UWB transceiver, and trigger an event in response to a determination of the receiver being either located in one of a plurality of subspaces, or leaving or entering the one of the plurality of subspaces, wherein the determination is made utilizing at least the CIR information.

20 Claims, 29 Drawing Sheets

(56) References Cited

OTHER PUBLICATIONS

Bernhard Großwindhager et al., "Demo Abstract: UWB-based Single-anchor Low-cost Indoor Localization System." SenSys'17, Nov. 6-8, 2017, 2 Pages.
Yifeng Cao et al., "ITrackU: Tracking a Pen-like Instrument via UWB-IMU Fusion." MobiSys '21, Jun. 24-Jul. 2, 2021, 14 Pages.
Tianyu Wang et al., "High-Accuracy Localization Using Single-Anchor Ultra-Wide Bandwidth Systems." 2019 IEEE/CIC International Conference on Communications in China (ICCC), 5 Pages.
Pablo Corbalán et al., "Ultra-wideband Concurrent Ranging." arXiv:2004.06324v2 [cs.NI] Jul. 21, 2020, 40 Pages.
Pablo Corbalán et al., "Chorus: UWB Concurrent Transmissions for GPS-like Passive Localization of Countless Targets." 18th International Conference on Information Processing in Sensor Networks (co-located with CPS-IoT Week 2019) (IPSN '19), Apr. 16-18, 2019, Montreal, QC, Canada. ACM, New York, NY, USA, 12 pages.
Davide Vecchia et al., "TALLA: Large-scale TDoA Localization with Ultra-wideband Radios." 2019 International Conference on Indoor Positioning and Indoor Navigation (IPIN), Sep. 30-Oct. 3, 2019, Pisa, Italy, 8 Pages.
Davide Vecchia et al., "Playing with Fire: Exploring Concurrent Transmissions in Ultra-wideband Radios." 2019 16th Annual IEEE International Conference on Sensing, Communication, and Networking (SECON), 10 Pages.
Jianiun Ni e al., "Ultra-Wideband Time-Difference-of-Arrival High Resolution 3D Proximity Tracking System." IEEE/ION Position, Location and Navigation Symposium, Date of Conference: May 4-6, 2010, 7 Pages.

\* cited by examiner

IEEE 802.15.4a UWB PHY Frame Structure

ULTRA WIDE BAND BASED ZONE DETERMINATION SYSTEM

TECHNICAL FIELD

The present disclosure relates to radio frequency systems.

BACKGROUND

Industrial warehouse environments and logistics zones where vehicle traffic (AGVs, forklifts) and workers move in the same space may be accident prone environments. The US Bureau of Labor Statistics reported 74 deadly accidents and 9050 injuries involving forklifts in 2017. Thus, forklift accident and collision avoidance has a significant positive impact on workplace safety. The existing solutions in the market have shortcomings. In a UWB based system, proximity detection between devices may be realized on time-of-flight (ToF) based distance measurement. This distance may be measured in an omni-directional fashion. The system installed on a forklift cannot determine if the device attached to the worker is in the direction of movement of the fork lift, which may be dangerous, or on the opposite side, which is safe.

A ToF based distance measurement requires multiple UWB messages to be exchanged between the devices. In the example scenario when a forklift approaches a group of workers, the distance measurement needs to be carried out for each worker individually, establishing a timing and coordination problem.

In many industrial intralogistics spaces, additional safety measures are taken to separate foot traffic from forklift traffic. For example, a factory may set up mechanical barriers to create a "safe zone." If a UWB equipped forklift passes by a worker in a "safe zone," an alarm may be triggered, as the system cannot determine that the worker is inside the "safe zone" and in this case no alarm shall be activated. This creates many 'false alarms' which lowers the social acceptance of the collision avoidance system overall. A system which can reliably detect that the worker enters a 'safe zone' and disable the alarm will improve this situation. Of course—as soon as the worker leaves the 'safe zone'—the alarm functionality must be re-enabled reliably.

SUMMARY

A first embodiment discloses a system that includes one or more ultra-wideband (UWB) transmit apparatuses configured to communicate an UWB signal that encodes radio packets that includes at least a preamble and a start frame delimiter (SFD) enabling a receiver to recover a reception timestamp and a channel impulse response (CIR) of the transmission, wherein the one or more UWB transmit apparatuses are located in a fixed position and configured to divide a space into a plurality of subspaces configured to be assigned an attribute associated with the subspaces, including one or more UWB receivers configured to extract CIR information from the one or more radio packets received from a UWB transceiver, and trigger an event in response to a determination of the receiver being either located in one of a plurality of subspaces, or leaving or entering the one of the plurality of subspaces, wherein the determination is made utilizing at least the CIR information.

A second embodiment discloses a system that discloses one or more ultra-wideband (UWB) transmit apparatuses including a transceiver configured to communicate an UWB signal that encodes radio packets that enables at least a receiver to recover a channel impulse response of transmission of the UWB signal, wherein the one or more UWB transmit apparatuses are located in a fixed position and configured to divide a space into a plurality of subspaces configured to be assigned an attribute associated with the subspaces; including one or more UWB receivers configured to extract CIR information from the one or more radio packets received from a UWB transceiver, and trigger an event in response to a determination of the receiver being either located in or leaving a first subspace, wherein the determination is made utilizing at least the CIR information.

A third embodiment discloses, a system that includes one or more ultra-wideband (UWB) transmit apparatuses including a transceiver configured to communicate an UWB signal that encodes radio packets that enables at least a receiver to obtain a channel impulse response of transmission of the UWB signal, wherein the one or more UWB transmit apparatuses are located in a position and configured to divide a space into a plurality of subspaces configured to be assigned an attribute associated with the subspaces, including one or more UWB receivers configured to extract CIR information from the one or more radio packets received from a UWB transceiver, and trigger an event in response to a determination of the receiver entering or leaving a one of the subspaces of the plurality of subspaces, wherein the determination is made utilizing at least the CIR information.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The disclosure, in one embodiment, describes an apparatus and a method to utilize the radio frequency (RF) ultra-wideband (UWB) channel impulse response (CIR) to determine if a mobile UWB receiver (tag) entered a precisely defined spatial zone with respect to a UWB transceiver apparatus. UWB may be a radio technology that utilizes a very low energy level for short-range, high bandwidth communications over a large portion of radio spectrum. UWB may be utilized for target sensor data collection, precise locating, and tracking. UWB support may be found in various devices, such as cellular phones. The UWB physical layer may include two parts, a preamble and start-of-frame delimiter. The preamble may be utilized for a receiver to execute timing acquisition and other synchronization tasks, while detecting the start-of-frame delimiter, receiver is informed about the end of the synchronization header.

Applications for such technology may include safety systems in industrial intralogistics. For example, collision avoidance between AGVs, forklifts and human workers, automatic speed control for forklifts when entering critical zones, or precisely defined 'warning disabled' zones in logistics workspaces.

Another potential application is timing and scoring for sports events. In many sports, timing is triggered, or a score/penalty is awarded when a competitor, a ball, or a remote-controlled vehicle crosses a plane or enters a zone. By using the system described, timing and scoring can be automated, reducing the need for human judges and improving the competition taking the 'human error' out of the equation.

Figure 1:
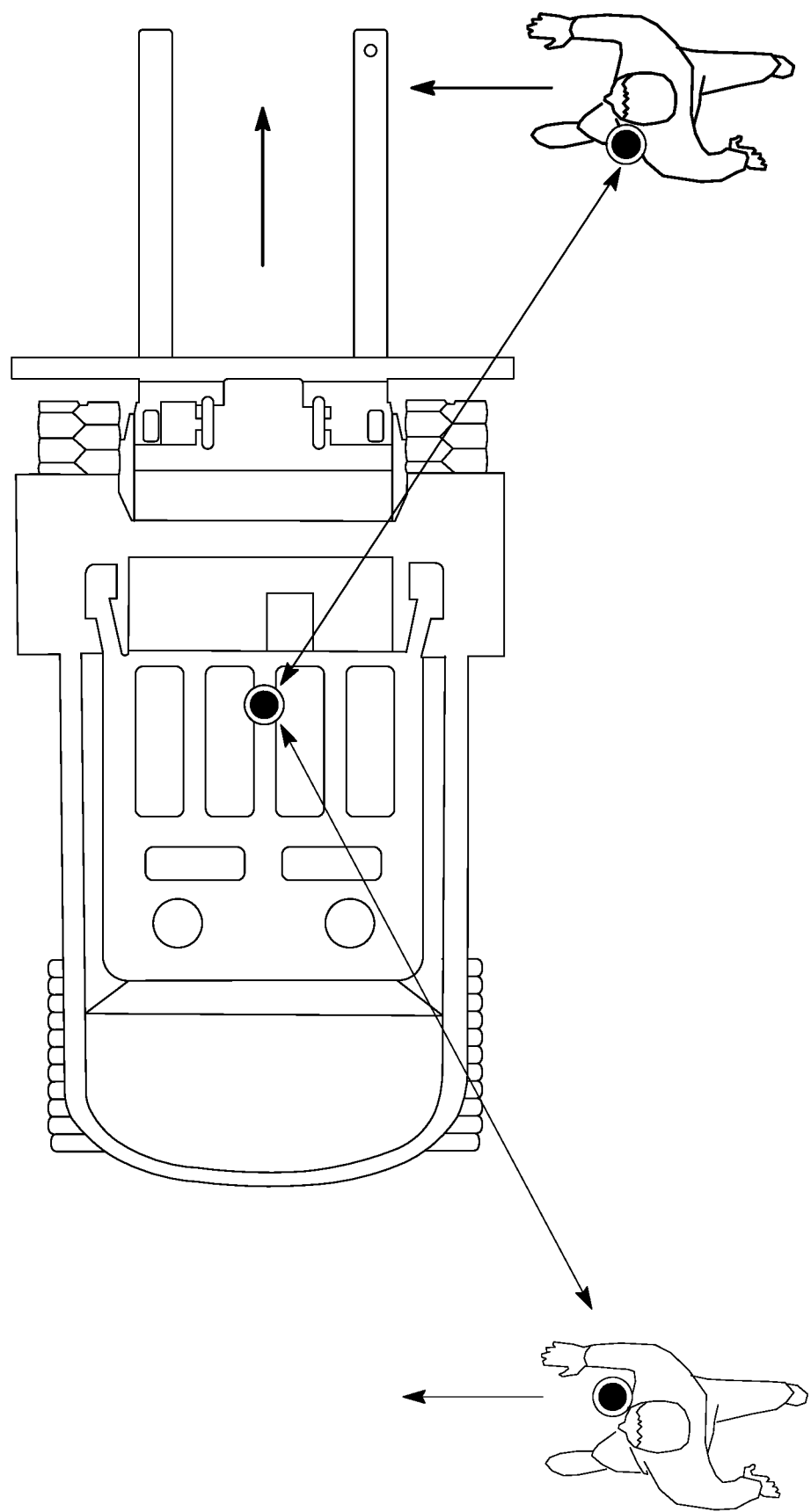
FIG. 1 illustrates an RF-based proximity detection between worker and forklift.
Figure 2:
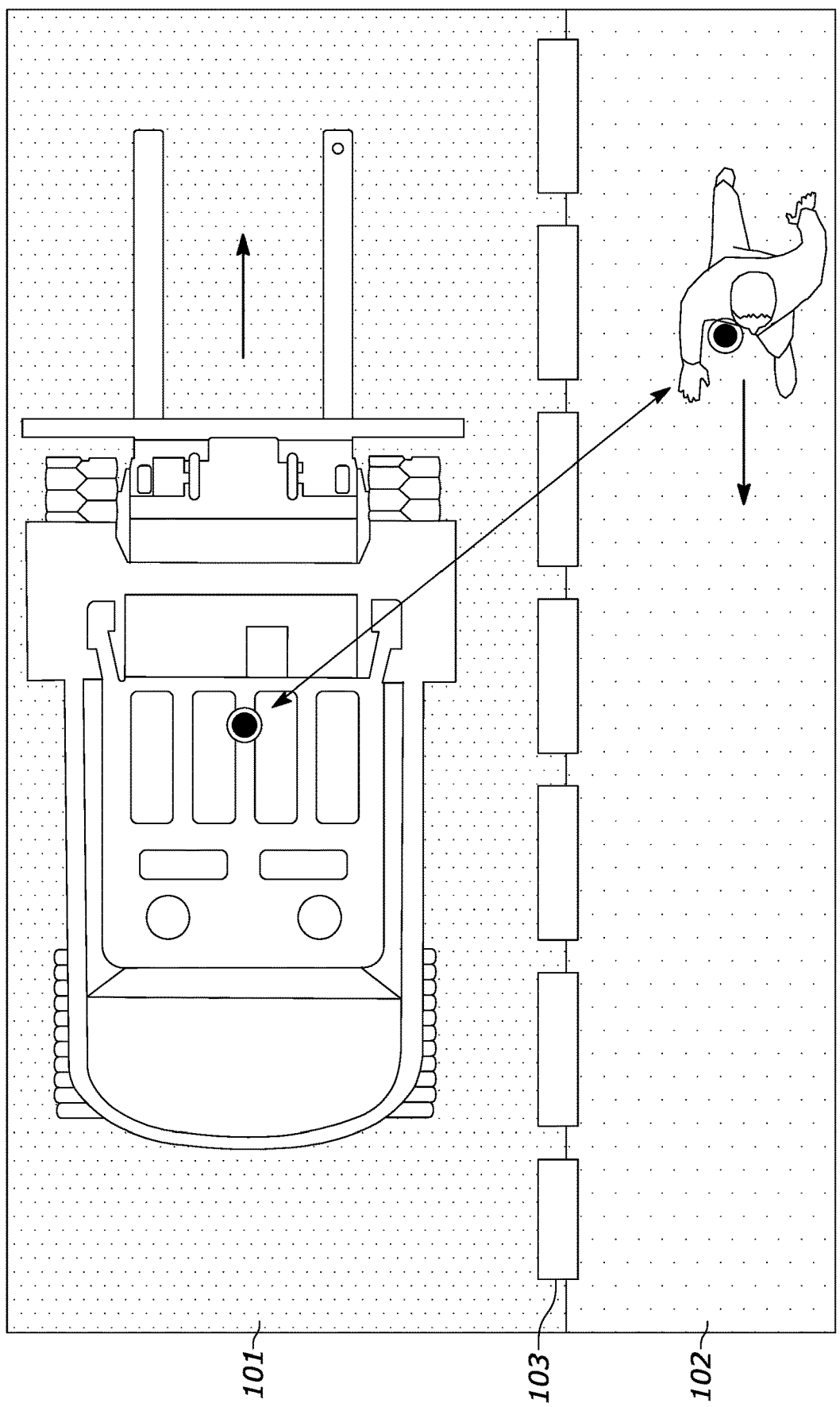
FIG. 2 illustrates an example of a worker and a forklift in various zones.
Figure 3:
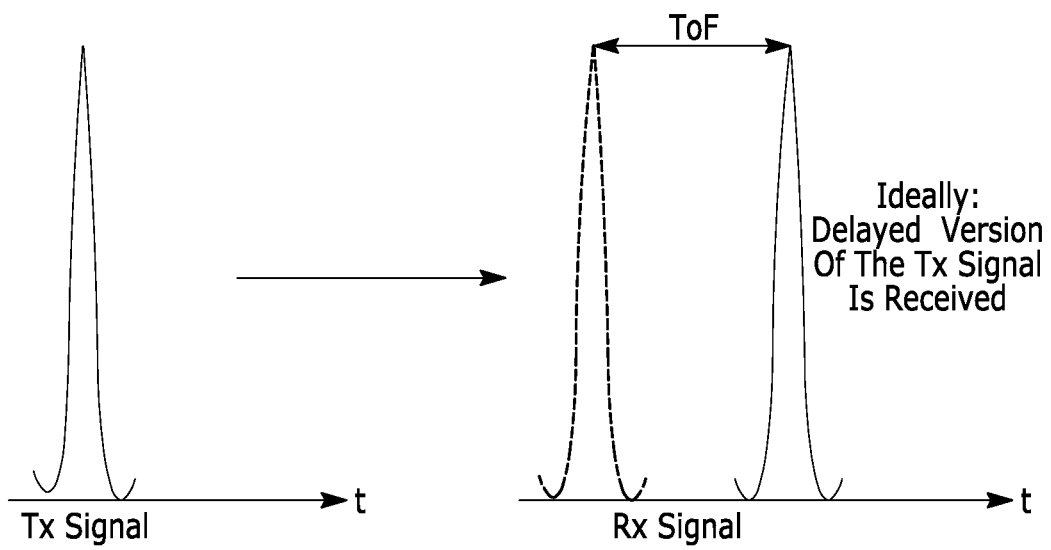
FIG. 3 illustrates a basic principle of UWB signal transmission.
Figure 4:
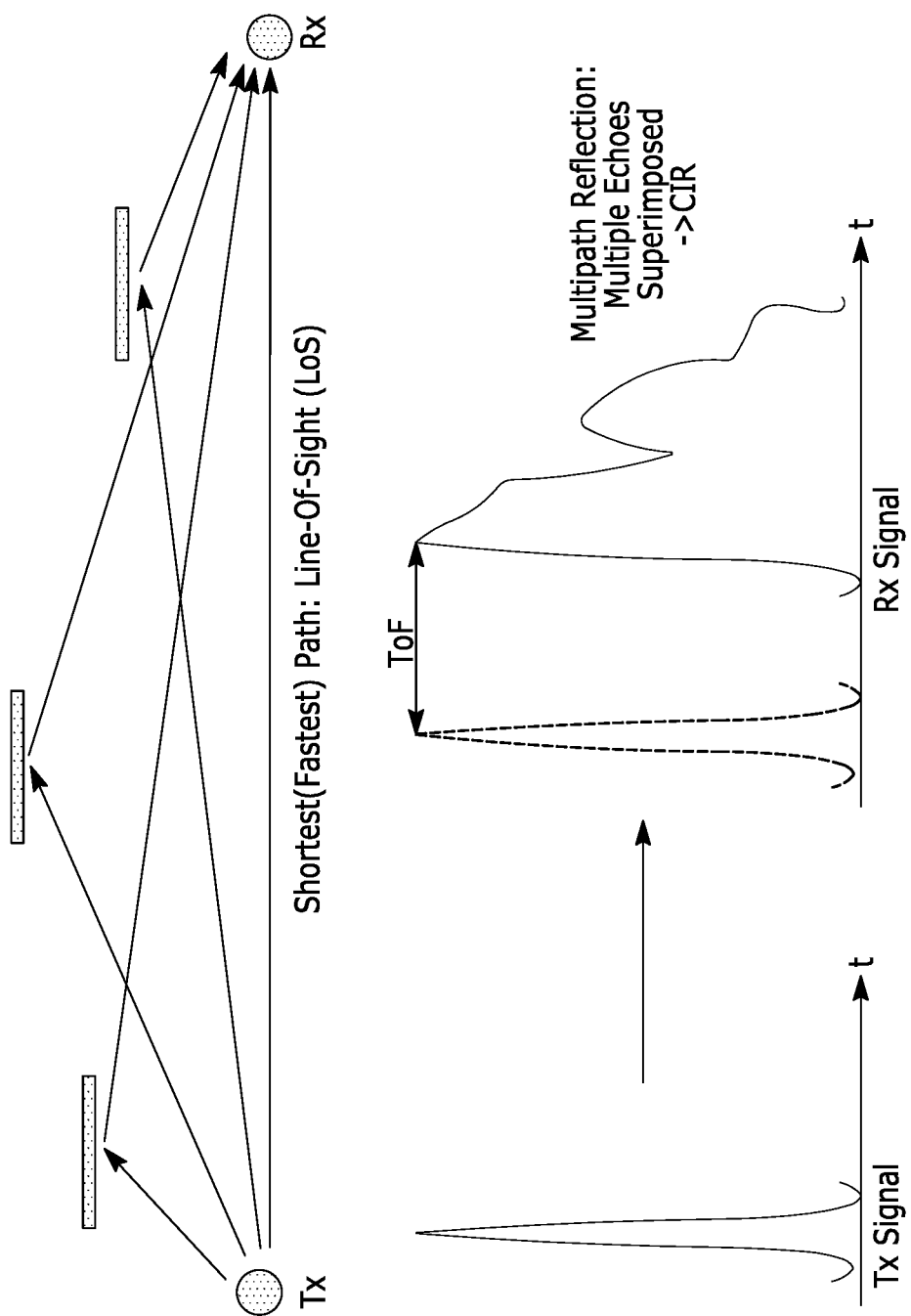
FIG. 4 illustrates a UWB signal reception in reflective environment.

FIG. 1 illustrates an RF-based proximity detection between worker and forklift. FIG. 2 illustrates an example of a worker and a forklift in different zones. In such examples, the distance measured may be omni-directional and thus the system may not be able to determine if the device attached to the work is in the direction of movement or a safe direction. For example, in FIG. 1, the forklift does not know if the RF tag on a user would indicate the person is in front or behind the forklift. In FIG. 2, the worker may be located in a "safe zone" while the fork lift is in an unsafe zone. However, this may require mechanical barriers that require human interaction to put up or to ensure is accurate. Regardless, the embodiments disclosed below may avoid triggering an unnecessary alarm when a person is found in a "safe zone," as a beep or noise form a constant alarm may be annoying and FIG. 3 illustrates a basic principle of UWB signal transmission. FIG. 4 illustrates a UWB signal reception in reflective environment. A UWB transmitter may send out a UWB signal. In an ideal non-reflective environment, after a time-of-flight (ToF)—which is determined by the speed of light 'c' and the geometric distance between the transmitter antenna and the receiver antenna—a delayed version of the transmit signal is received. In a non-ideal reflective RF environment, the multiple RF paths exist between the transmitter and the receiver. The receiver receives the signal traveling on direct line-of-sight path first and also multiple echoes reflected by the environment after the first path. The superposition of these signals may be called the channel impulse response (CIR), as illustrated in FIG. 4.

Figure 5:
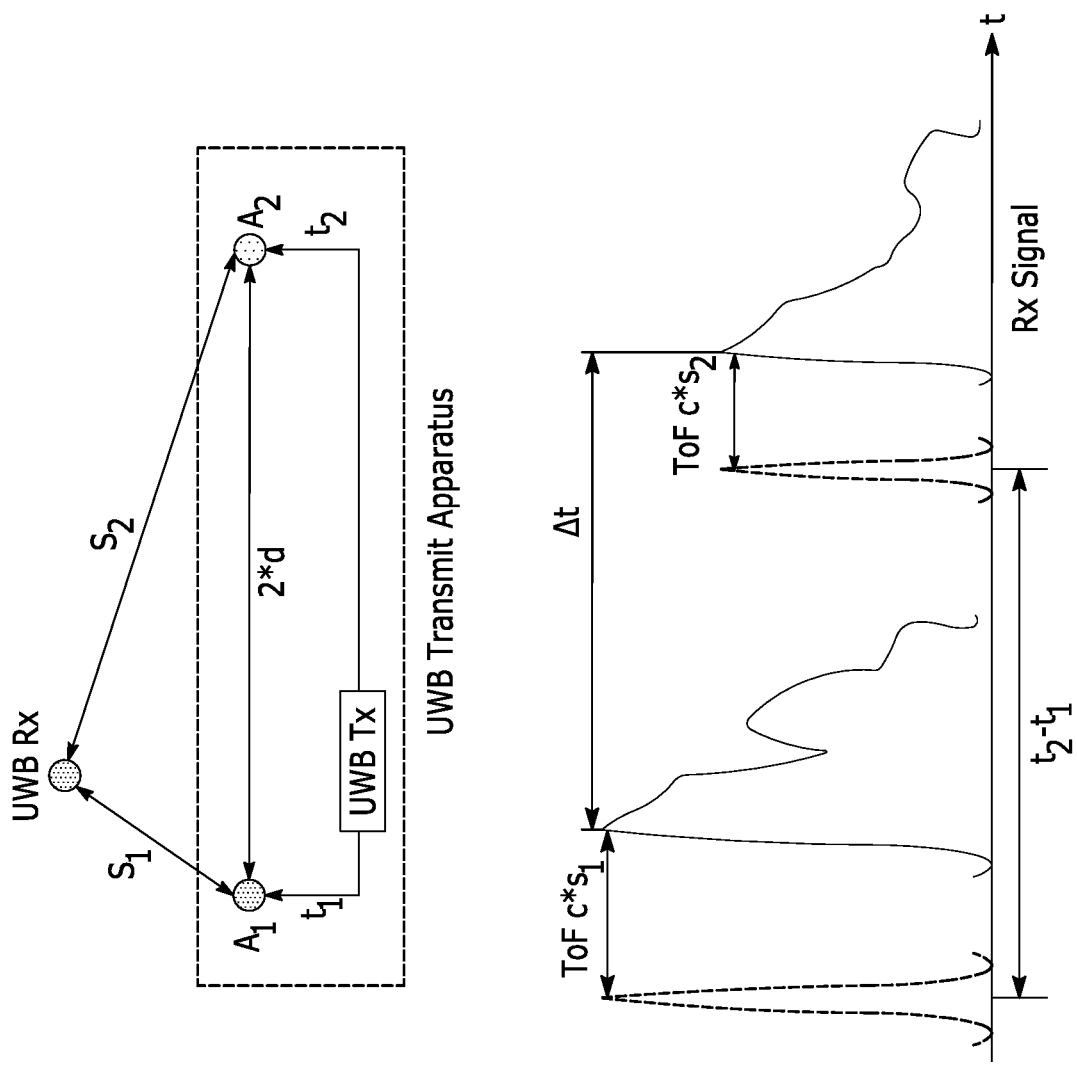
FIG. 5 illustrates a UWB transmit apparatus and a received signal.

FIG. 5 illustrates a UWB transmit apparatus and a received signal. A UWB transmitter may be part of a UWB transceiver utilizing (at least) two antennas A1 and A2. The antennas may be spaced 2*d apart and fed with a UWB signal with a time delay t1 and t2. The signals from A1 and A2 reach the UWB receiver at different points in time, determined by the time delays (t1, t2 with t2>t1) and the geometric distance (s1, s2). In the receiver's CIR, these two signals create two separate peaks of the complex magnitude. From the time difference of arrival (TDoA) Δt between the signals derived from the CIR, the relative proximity of the UWB receiver with respect to A1 and A2 can be calculated. This information can be used to determine the zoning problem illustrated above.

Figure 6:
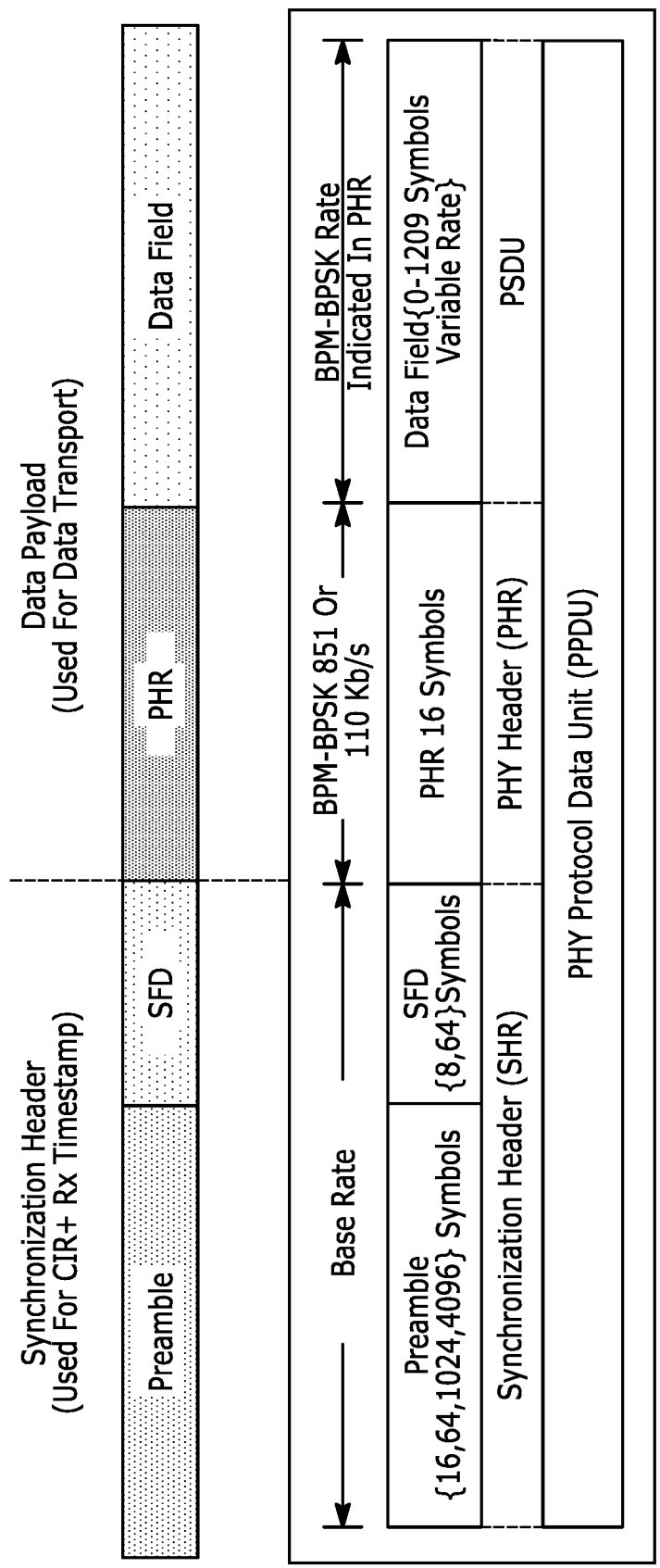
FIG. 6 illustrates an embodiment of a UWB packet structure.

FIG. 6 illustrates an embodiment of a UWB packet structure. FIG. 6 provides an overview of the structure of an UWB packet formatted according to the IEEE802.15.4 UWB standard. The synchronization header may include a 'preamble' and a 'start frame delimiter' (SFD) is used by the receiver to timestamp the exact time of packet reception for ranging and to measure the channel impulse response (CIR). As shown, the preamble may have 16, 64, 1024, 4096, etc. symbols. The SFD may have 8 or 64 symbols, for example. The synchronization header may be utilized for the CIR information and a timestamp associated with reception/transmission.

The data payload consisting of the 'phy header' (PHR) and the 'data field' is used to transport data from the UWB transmitter to the UWB receiver. In one embodiment, a basic principle may be that when no additional data transfer in the UWB packet is required or desired, the transmission and reception of the synchronization header is sufficient. Thus, the information from the data payload may not be required for a basic embodiment.

Figure 7:
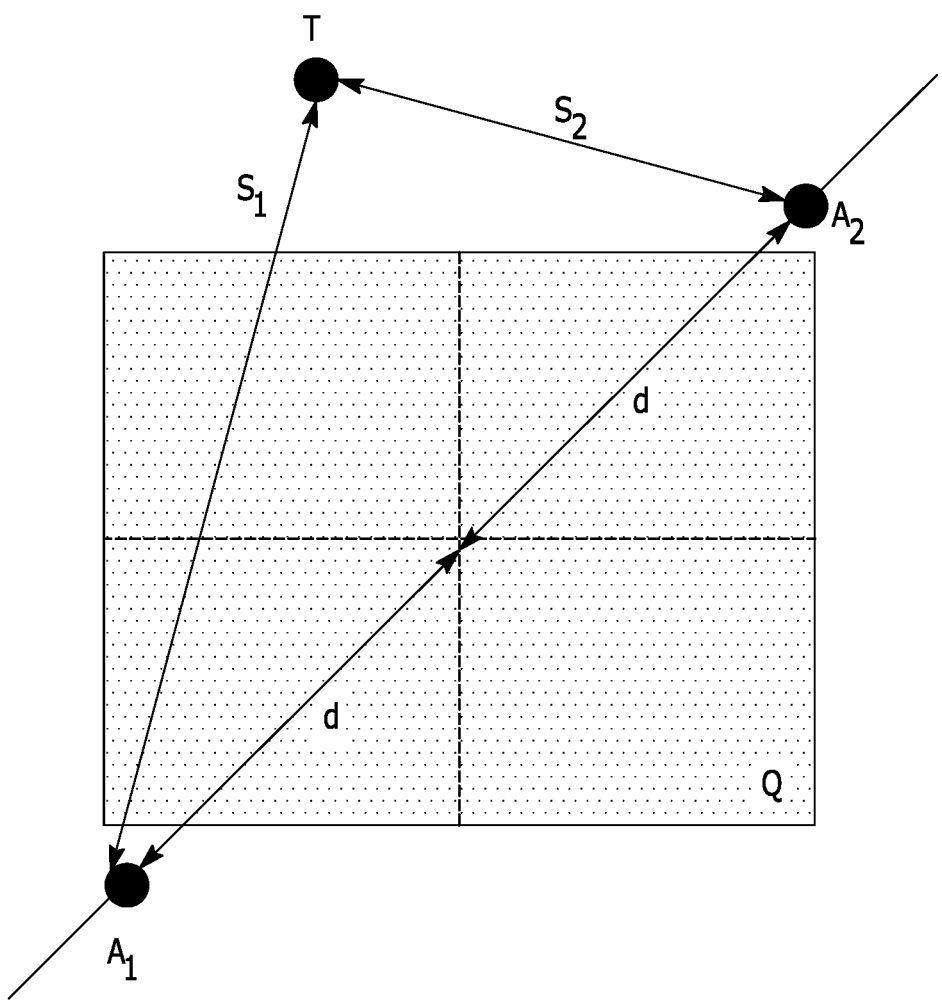
FIG. 7 is an embodiment of a general geometric arrangement.

FIG. 7 is an embodiment of a general geometric arrangement. Two stationary antennas $A_1$ and $A_2$ connected to a UWB transmit apparatus are spaced 2d apart. The stationary antennas may be stationary with respect to each other or the transmit apparatus, but the transmit apparatus may be movable, for example, when on a vehicle like a forklift. A plane Q is defined perpendicular to the line connecting $A_1$ and $A_2$, at a distance d from $A_1$ and $A_2$. A mobile tag T moving or positioned in a space, relative to $A_1$ and $A_2$, at a distance $s_1$ from $A_1$ and distance $s_2$ from $A_2$.

Figure 8:
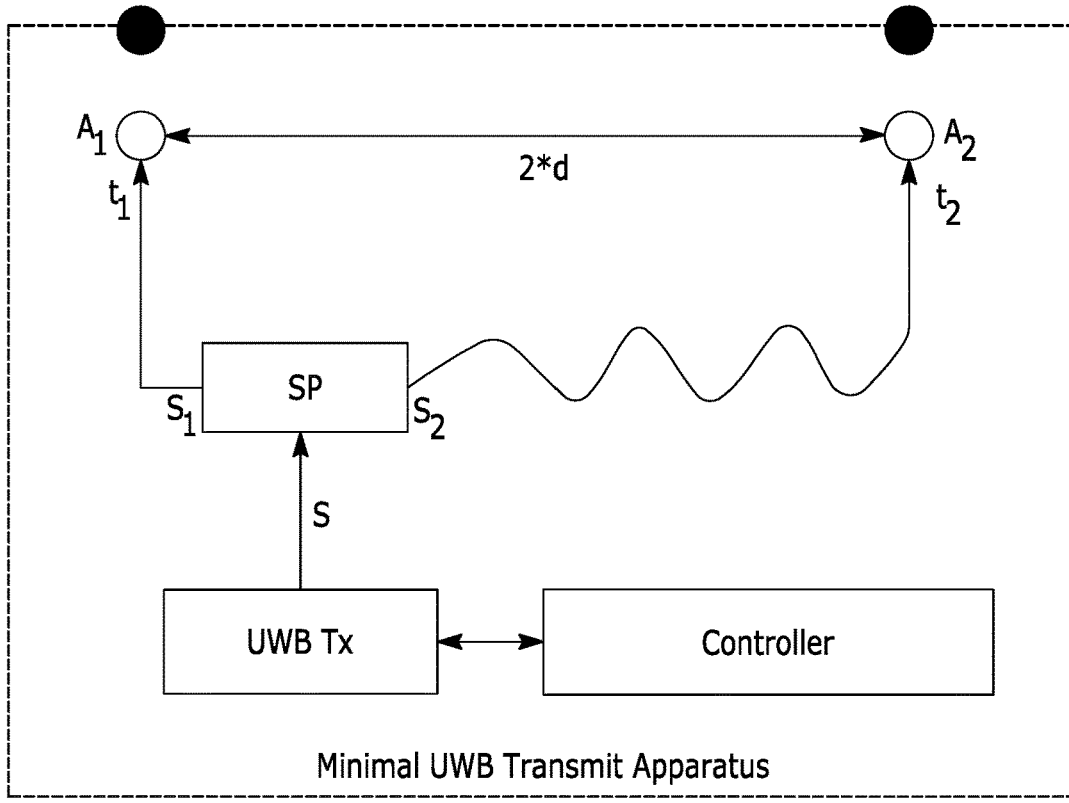
FIG. 8 is a high-level schematic of a UWB transceiver apparatus.

If T's position is in the plane Q: $s_1=s_2$
For all positions where T is closer to $A_1$ than to $A_2$: $s_1<s_2$
For all positions where T is closer to $A_2$ than to $A_1$: $s_1>s_2$ FIG. 8 is a high-level schematic of a UWB transceiver apparatus. In a basic implementation, a UWB transmitter may be generating a radio packet P in regular intervals. P may be encoded in the impulse radio UWB signal S, which may include a preamble sequence, a start frame delimiter and an optional data payload. In a more advanced implementation, the device can transmit and receive UWB packets and is denoted a transceiver.

The UWB signal S may be fed into a splitter SP, creating two separate signals $S_1$ and $S_2$. The split can happen by power division ($S_1$ and $S_2$ are created simultaneously), by time multiplexing ($S_1$ and $S_2$ are created sequentially) or a combination of the two techniques, etc. Of note, that $S_1$ and $S_2$ may be coherent, as they are created from the same source signal S. There may be no carrier frequency offset between $S_1$ and $S_2$ and the timing offset between the signals is constant.

The signals $S_1$ and $S_2$ may be fed to the antennas $A_1$ and $A_2$ through a RF path with a defined delay, e.g. through RF cables. In such an example, it may be assumed that the transmitter is located physically close to antenna $A_1$ and $S_1$ may leave the antenna $A_1$ without significant delay $t_1$.

Next, $S_2$ may leave the antenna $A_2$ with a delay $t_2$. Additionally, $t_2$ may be larger than $t_1$ as $t_2$ may include the delay introduced by the signal traveling the distance 2*d and additional delay introduced by the reduced propagation speed inside a coaxial cable and optional additional length of cable. There may be optional amplification and attenuation of $S_1$ and $S_2$ to balance the power levels of the signals emitted by the antennas $A_1$ and $A_2$.

Figure 9:
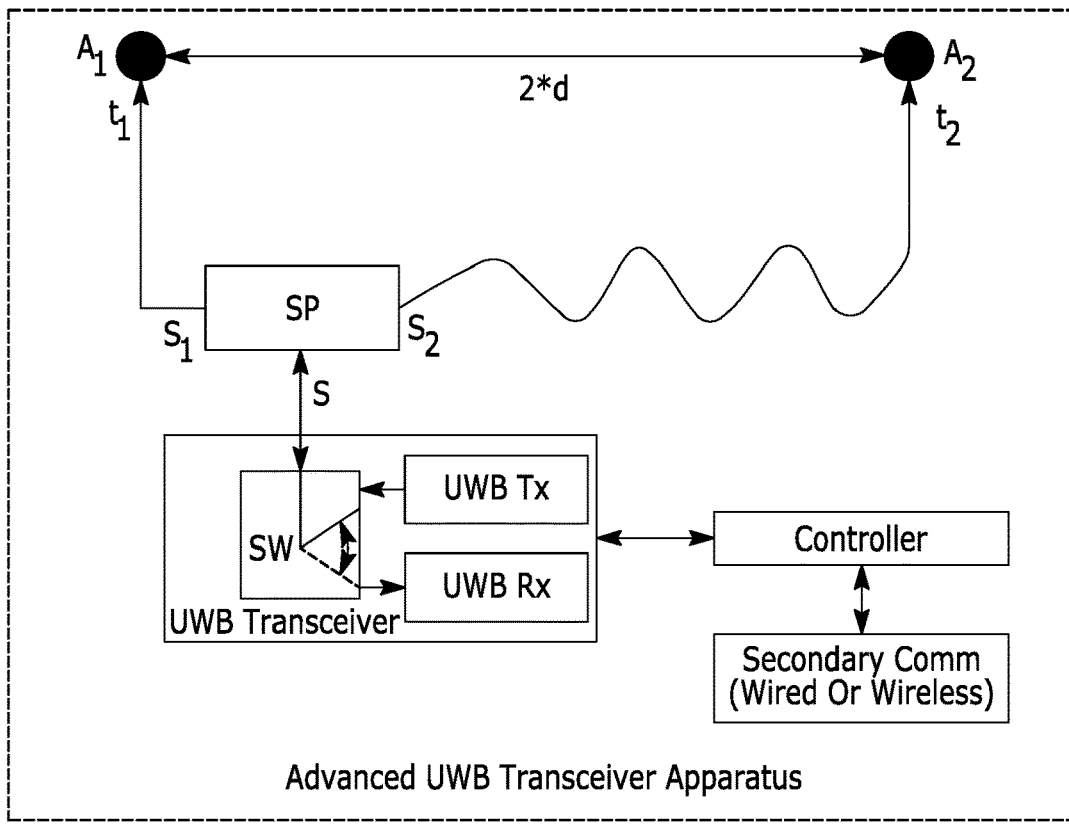
FIG. 9 illustrates an embodiment of another UWB transceiver apparatus.

FIG. 9 illustrates an embodiment of another UWB transceiver apparatus. In a more advanced implementation, the device can transmit and receive UWB packets with data payload, perform UWB ranging exchanges and also transmit or receive data through a secondary communication channel. Thus, the UWB transceiver may include a switch SW to flip between a transmission or reception. Furthermore, the secondary communication channel may be utilized in both a wired or wireless implementation. Thus, the secondary communication transceiver may be a variety of transceiver, such as RF, Wi-Fi, Bluetooth, narrowband RF, etc.

Figure 10:
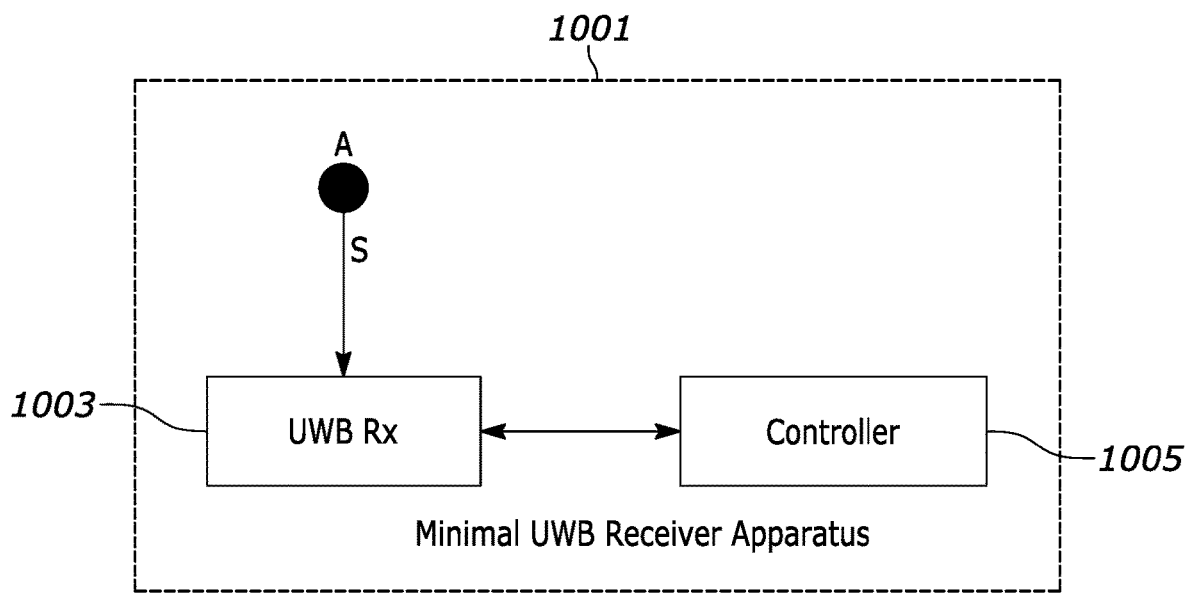
FIG. 10 illustrates an embodiment of a UWB receiver apparatus.

FIG. 10 illustrates an embodiment of a UWB receiver apparatus 1001. In a minimal implementation T contains an impulse radio UWB receiver capable of (at least) extracting the CIR (channel impulse response) information and optionally decoding the data payload. In a more advanced implementation, a UWB transceiver capable of transmitting and receiving UWB signals can be used. The UWB receiver 1003 may be in communication with a controller 1005 to control or process various signals S and data. The receiver may have an antenna A that receives a signal that includes an antenna that receives the UWB packets. The receiver 1003 may extract or decode the UWB packets to extract the CIR information or decode the data payload, with or without assistant from the controller 1005.

Figure 11:
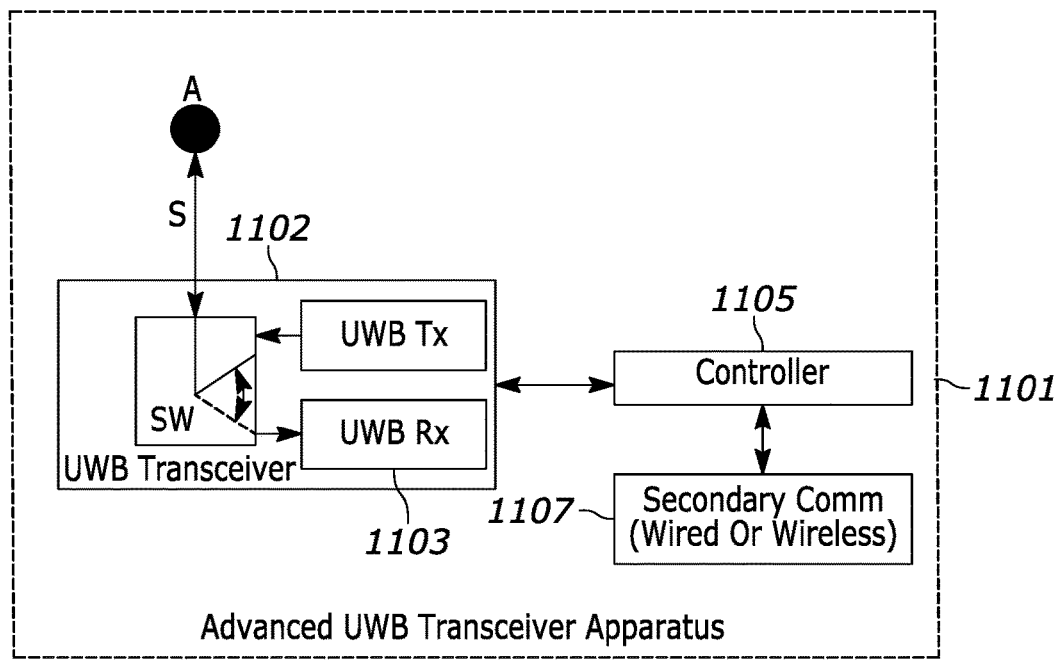
FIG. 11 illustrates an embodiment of an implementation found of the embodiment of the receiver apparatus in FIG. 10.

FIG. 11 illustrates an embodiment of an implementation found of the embodiment of the receiver apparatus in FIG. 10. FIG. 11's embodiment of a UWB transceiver apparatus 1101 may be considered an advanced embodiment. For example, in addition to a UWB receiver 1103 and controller 1105, the apparatus 1101 may include a secondary communication controller 1107 that is communication with the controller 1105. The secondary communication controller 1107 may be any type of wireless communication signal, including ultra-wideband or any radio technology that may be a short-range but high-bandwidth communication. Of course, other wireless signals may be utilized such as Bluetooth or Wi-FI.

Figure 12:
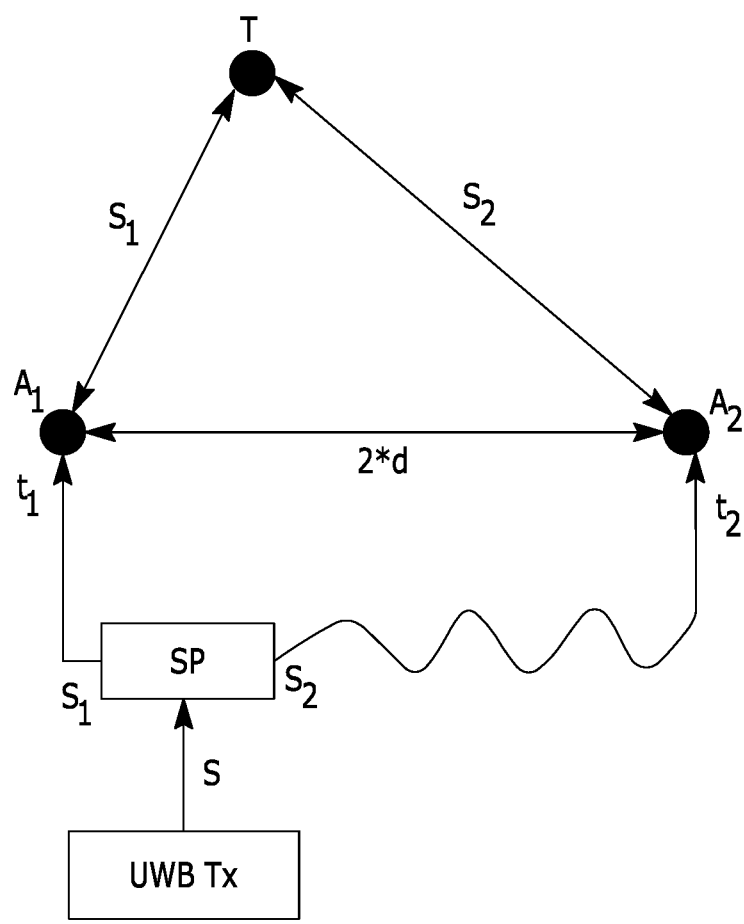
FIG. 12 illustrates an embodiment of a reception process among antennas and transmitters.

FIG. 12 illustrates an embodiment of a reception process among antennas and transmitters. The splitter SP may split signal S into two signals labeled S1 and S2.

S1 reaches T after $t_{D1}=t_1+s_1*c$
S2 reaches T after $t_{D2}=t_2+s_2*c$

The time-difference of arrival $t_D$ of $S_1$ and $S_2$ at the location of T is:

$$t_D = t_{D2} - t_{D1} = (t_2 + s_2 *c) - t_1 + s_1*c)$$

For the cases:

$$s_1 = s_2: t_D = t_2 - t_1$$
$$s_1 > s_2: t_D < t_2 - t_1$$
$$s_1 < s_2: t_D > t_2 - t_1$$

By measuring $t_D$, T can determine its relative proximity to $A_1$ and $A_2$.

As measuring $t_D$ relies on passive reception of UWB signals only, T may not need to emit any UWB signals, thus an unlimited number of T can measure their individual $t_D$ in parallel.

Figure 13:
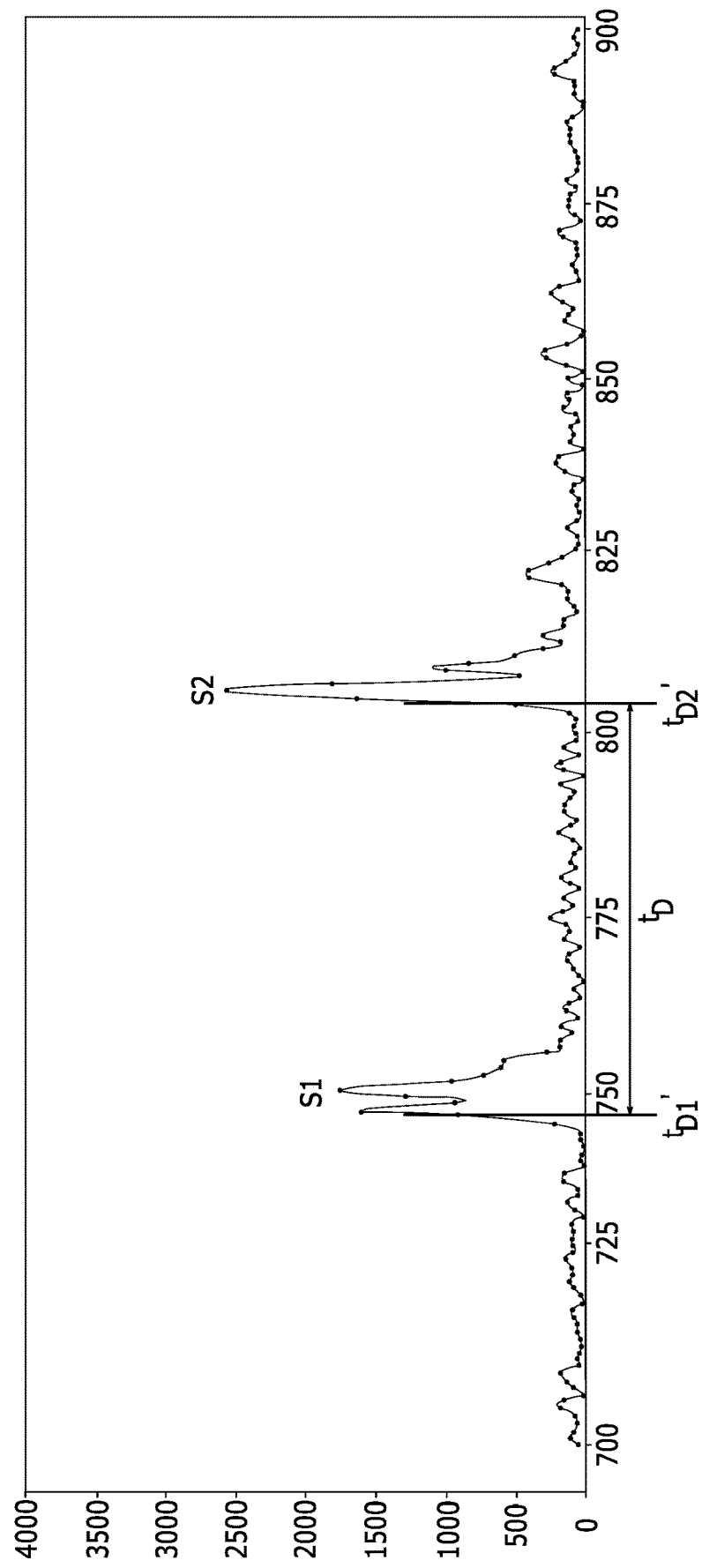
FIG. 13 is an example of graph illustrating a signal over time from a UWB device.

FIG. 13 is an example of graph illustrating a signal over time from a UWB device. An example of a real-world CIR signal created and measured with a set-up described above as illustrated in the various embodiments, such as FIG. 12. The horizontal axis may be a time axis, scaled—for the given implementation of UWB system—at approximately 1 nanosecond per unit (tap). The vertical axis may be the magnitude of the complex valued CIR samples collected by the receiver. The dots in the figure may represent the magnitude of the complex CIR tap data recorded over time. The line connecting the dots may be the analog reconstruction of the CIR signal (for illustrative purposes only).

The vertical lines may represent the relative arrival times $t_{D1}'$ and $t_{D2}'$ of S1 and S2 respectively. The numerical values for $t_{D1}'$ and $t_{D2}'$ can be obtained by applying a peak search/threshold crossing algorithm or a maximum gradient search algorithm as related to the CIR magnitude signal derived from the complex CIR data. The time resolution of $t_{D1}'$ and $t_{D2}'$ can be increased by interpolation between discrete sample points. Doing so, it is possible to determine $t_{D1}'$ and $t_{D2}'$ with sub nanosecond precision.

From the CIR data, the time difference of arrival $t_D$ can be calculated as $t_D = t_{D2}' - t_{D1}'$ Through intelligent choice of $t_2 - t_1$ in relation to d, it can be made sure that the individual contributions created by $S_1$ and $S_2$ do not overlap for all possible values of $(s_2-s_1)*c$ and the peaks near $t_{D1}'$ and $t_{D2}'$ are always clearly separable.

Figure 14:
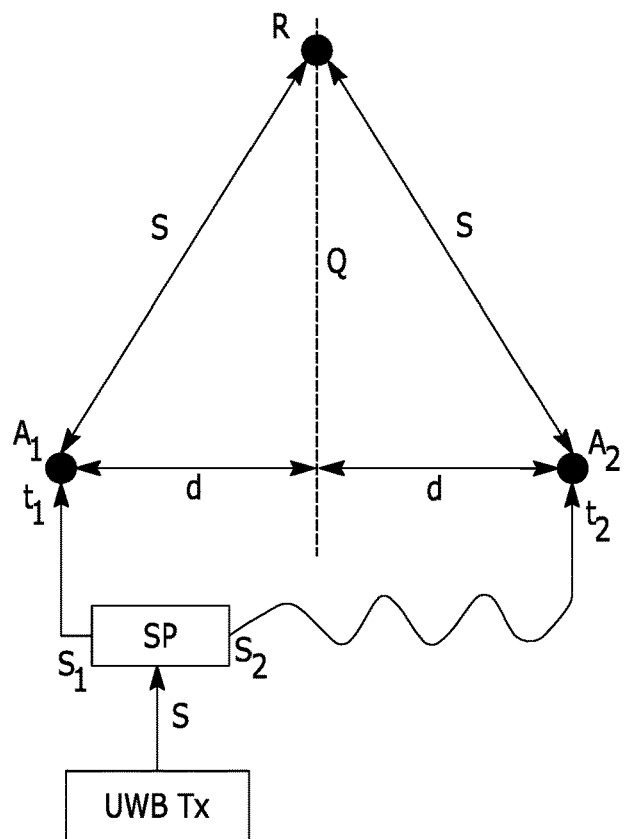
FIG. 14 is an example of an embodiment of a reference receiver.

FIG. 14 is an example of an embodiment of a reference receiver. For some applications, the delay $t_2 - t_1$ must be precisely known. As $t_1$ and $t_2$ depend on the hardware of the UWB transceiver apparatus, there might be temperature and aging induced effects changing the value of $t_2 - t_1$. Additionally, for safety critical applications, constant monitoring of the correct operation of the UWB transceiver apparatus might be required. Both points can be addressed by introducing a 'reference receiver' R or 'reference transceiver' as illustrated. The reference receiver may constantly measure the time interval (e.g., utilizing signals) of $t_1$ and $t_2$. In some embodiments, the reference receiver may be stationary and thus may be at a fixed location as opposed to moving.

A stationary reference receiver R can be placed at location in the plane Q where $s_1 = s_2 = s$. Then $t_{DR} = t_{D2} - t_{D1}$ at R's location becomes $(t_2 - t_1)$. The precise value of $t_2 - t_1$ might fluctuate over time due to temperature or aging effects. In addition, the value of $t_2 - t_1$ (which is installation dependent) might not be known a-priori by all T.

The measured (and optionally filtered) value of $t_{DR} = (t_2 - t_1)$ by R can be communicated back to the UWB transmit apparatus and e.g. be embedded into the data payload of subsequent packets P to provide T with a precise current reference value for $t_{DR}$ at the location of the plane Q. The data payload of each packet P may also contain additional information about system time to enable T to precisely timestamp events, e.g. the moment when the plane Q is crossed. In an alternative implementation of the system, this information can be transferred to T over a separate communication channel, e.g. a narrowband RF communication link.

The reference receiver R can also provide active monitoring and feedback of the proper function of the system. R can be used to trigger global system failure warnings, e.g. if $t_{DR}$ cannot be measured due to equipment failure, changes in the signal, interference, signal loss, or if $t_{DR}$ exceeds preset limits.

Figure 15:
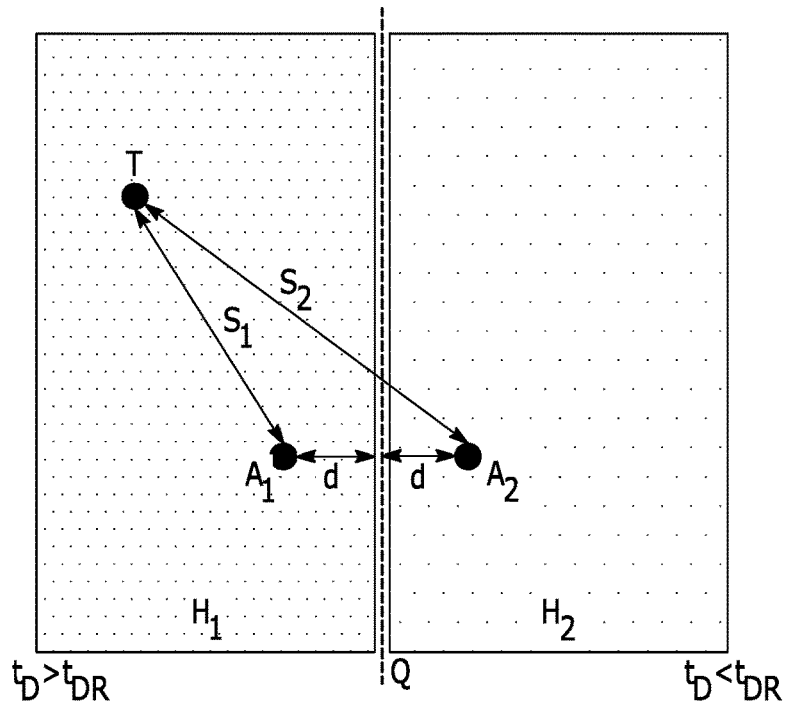
FIG. 15 illustrates an embodiment of a system with antennas and transmitters utilizing space division.

FIG. 15 illustrates an embodiment of a system with antennas and transmitters utilizing space division. As illustrated by FIG. 15, the plane Q may divide the 3D space around the antennas into two half-spaces $H_1$ and $H_2$. The two antennas may have a distance d that defines the space between the respective antenna and plane Q.

$H_1$ where $s_1 < s_2 : t_D > t_{DR}$
$H_2$ where $s_1 > s_2 : t_D < t_{DR}$
The surface Q where $t_D = t_{DR}$ is a flat plane
The surface $J_1$ where $t_D = t_{DR} + t_o$ is a hyperboloid in $H_1$
The surface $J_2$ where $t_D = t_{DR} - t_o$ is a hyperboloid in $H_2$ Thus, by measurement of $t_D$ by T and the knowledge of $t_{DR}$, it can be determined if T is located in $H_1$ or $H_2$, enabling the functionalities outlined in the introduction. Thus, each of the hyperboloids may be described as a safe zone or un-safe zone in the applications. The zones may be described as any type of label and thus may just be used to identify a specific location as related to a zone. In an application, an alert may be sent if the receiver is known to be in an unsafe zone. If the receiver is located in a safe zone, the system may continue monitoring the movement.

Depending on the use-case the comparison of $t_D$ and $t_{DR}$ and the triggering of subsequent actions can be done by T or a different entity, receiving the information about $t_D$ and $t_{DR}$ either by a UWB packet or an alternative means of communication. The reception of the signal from the UWB transceiver apparatus can also be combined with a single-sided or double sided UWB two-way ranging exchange. As by intelligent choice of $t_2$ in relation to d, the signal from $A_1$ may arrive first, the UWB timestamping mechanism on both sides works correctly through the standard mechanisms implemented in commercial UWB transceivers and the distance $s_1$ can be measured. This functionality can be used to e.g., solve the scenario illustrated in FIG. 1.

Figure 16:
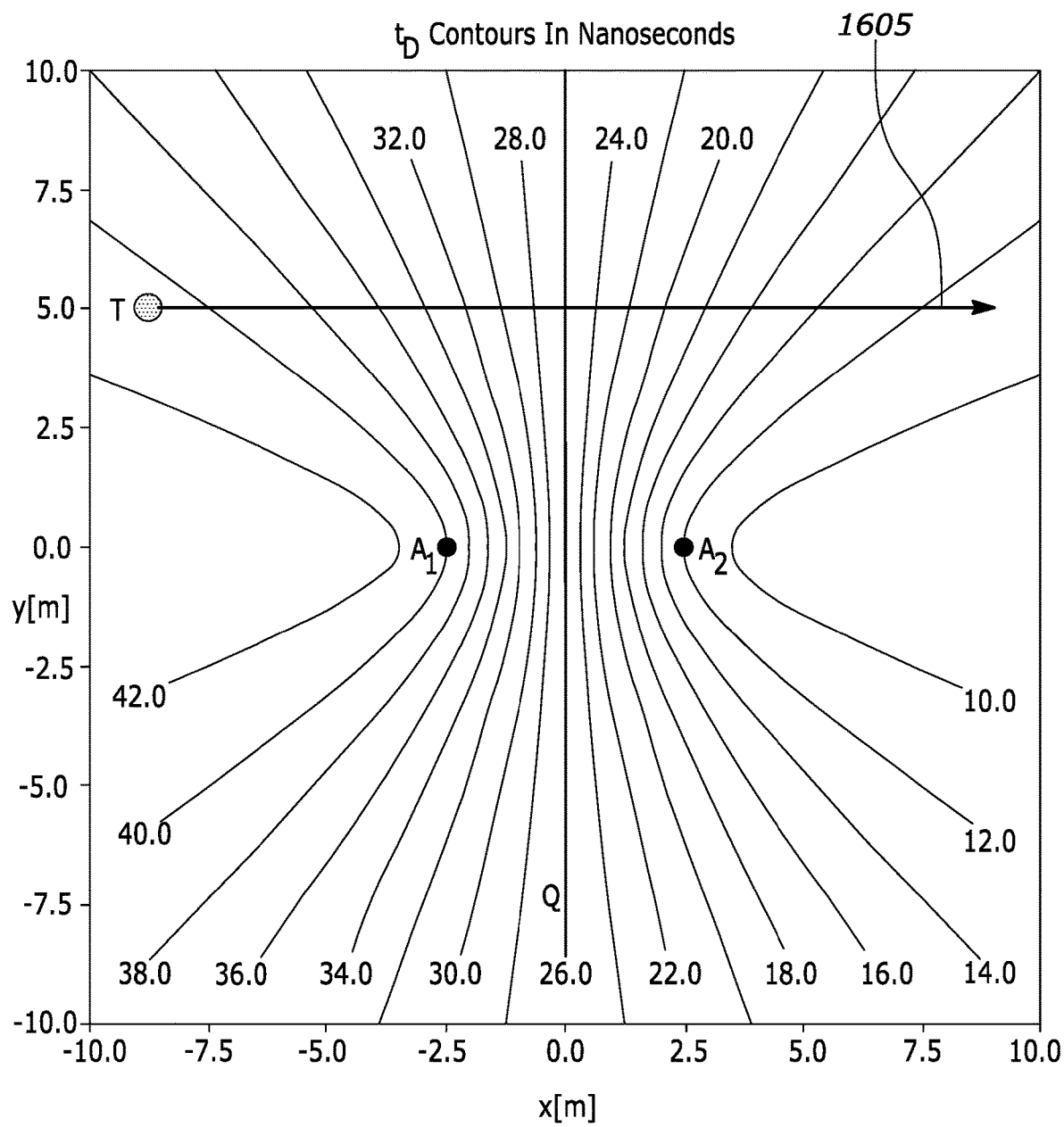
FIG. 16 illustrates an embodiment of a contour plot as related to an embodiment.

FIG. 16 illustrates an embodiment of a contour plot as related to an embodiment. An example of the system described is illustrated in Error! Reference source not found. which plots the z=0 plane: antenna $A_1$ is positioned at (−2.5 m, 0 m, 0 m), antenna $A_2$ is positioned at (2.5 m, 0 m, 0 m). The time difference $t_{DR} = t_2 - t_1$ (by the choice of $t_1$ and $t_2$) is set to 26 ns. The black contours show the value of ta for positions in the z=0 plane. The position of the plane Q intersects the image plane at x=0 and is illustrated. A receiver T may be moving through the space from (−8 m, 5 m, 0 m) to (8 m, 5 m, 0 m). The receiver's path may be illustrated in Error! Reference source not found. by arrow line 1605.

Figure 17:
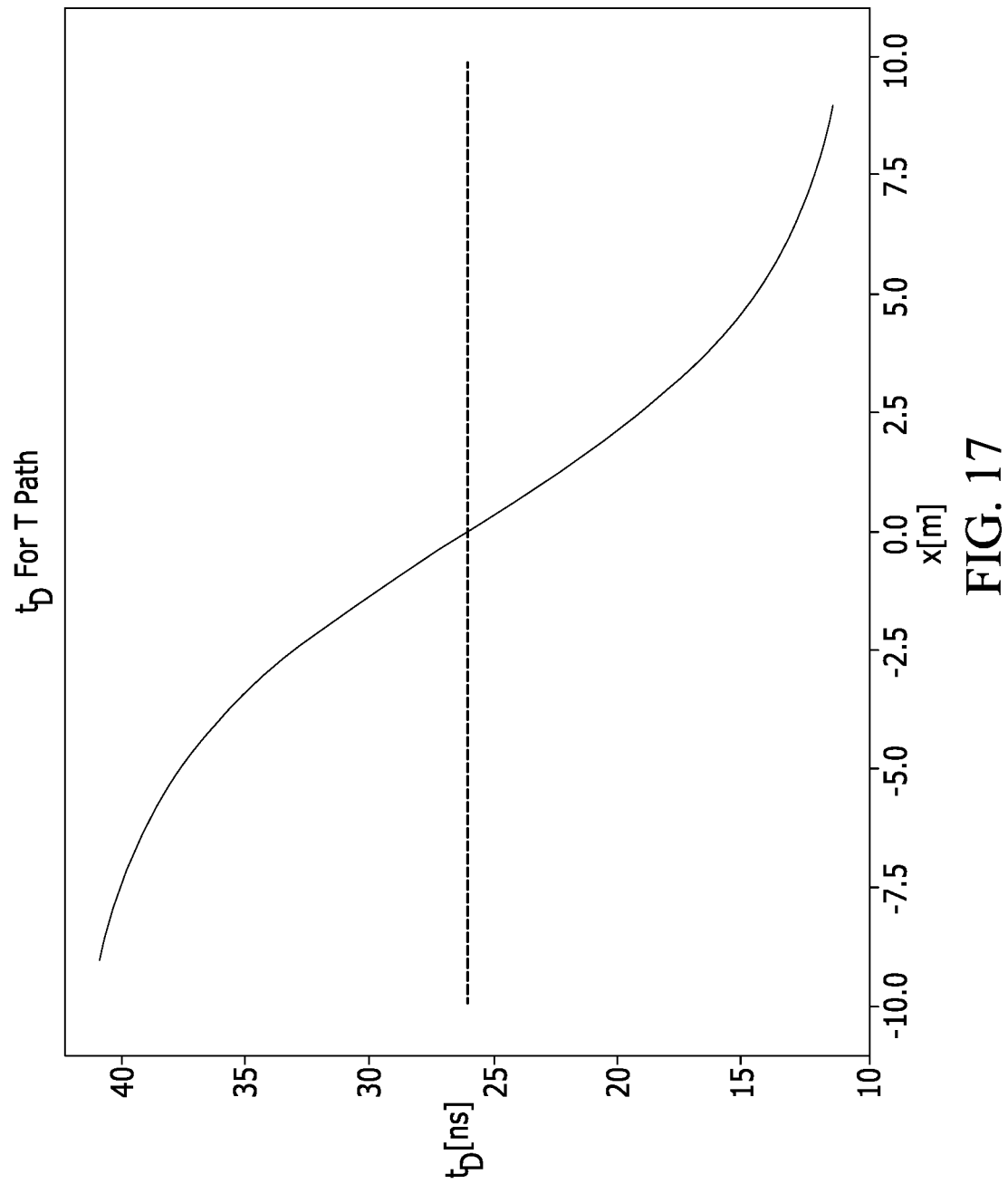
FIG. 17 illustrates an example of a to plot as related to the embodiments disclosed.

FIG. 17 illustrates an example of a td plot as related to the embodiments disclosed. The value of $t_D$ measured at the receiver's position is illustrated in Error! Reference source not found. For positions x<0 (T may be closer to $A_1$), $t_D$ may be larger than 26 ns, for positions x>0 (T is closer to $A_2$), $t_D$ may be less than 26 ns. When crossing the plane Q at x=0, the value of $t_D$ may have the value of $t_{DR}$=26 ns.

Figure 18:
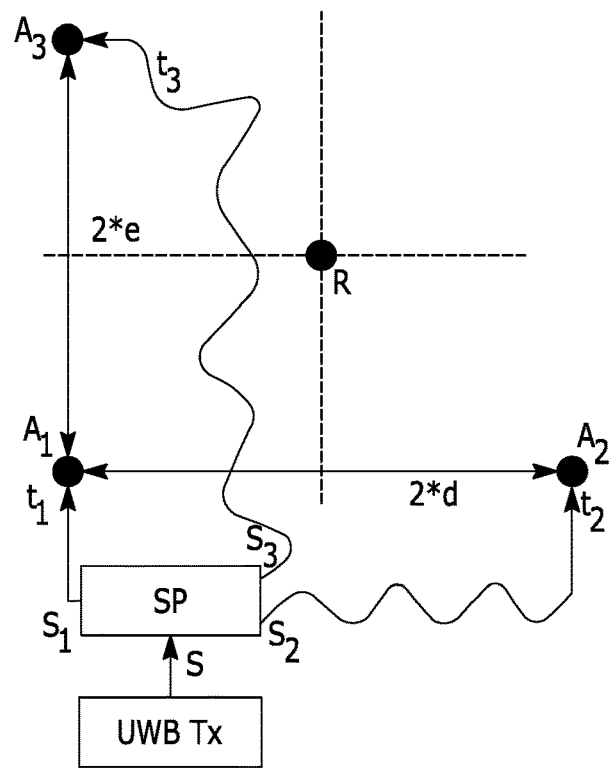
FIG. 18 illustrates an embodiment that includes extra antennas.

FIG. 18 may disclose an embodiment for including extra antennas. The concept laid out in the previous sections can be extended to more than one pair of antennas as illustrated by FIG. 18. For simplicity, only a third antenna A3 is shown, but more antennas are possible and any number of antennas are possible. The lines $A_1-A_2$ and $A_1-A_3$ do not need to be perpendicular to each other. For simplicity, the perpendicular case is shown.

In this implementation, the signal S is distributed to the antennas $A_1$, $A_2$ and $A_3$, by power splitting, time multiplexing or a combination thereof. Through intelligent choice of $t_1$, $t_2$, $t_3$, d and e, it can be made sure, that the peaks in the CIR do not overlap at T. In an alternative implementation, the signal is sent out alternating through a combination of $A_1+A_2$ and $A_1+A_3$. The information which antenna pair is used can be communicated as part of the UWB payload or through an alternative communication channel.

Figure 19:
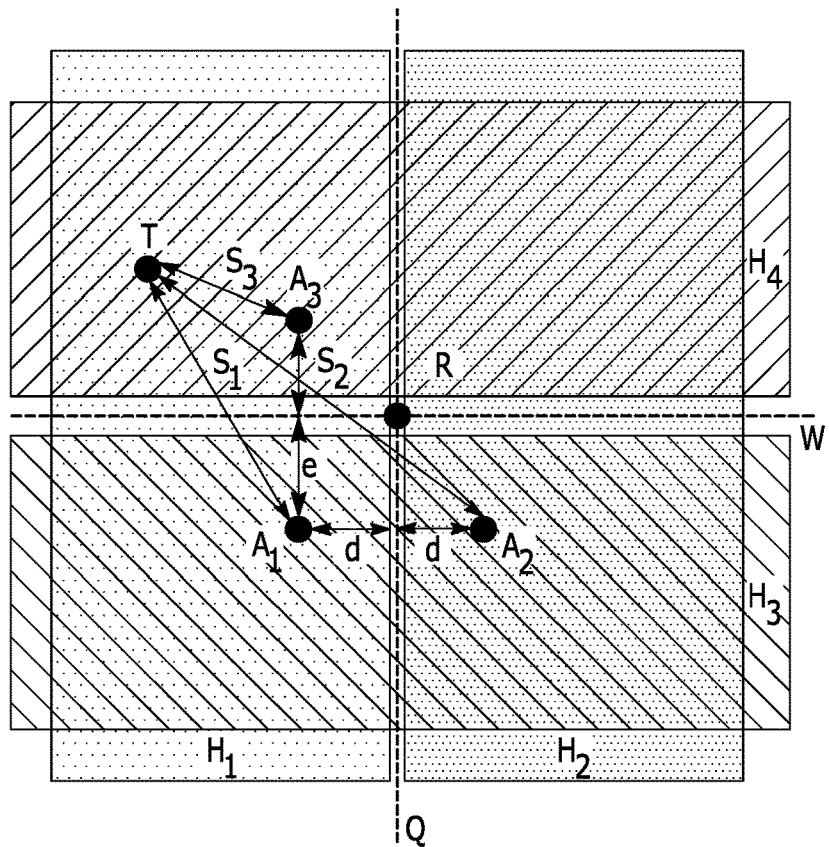
FIG. 19. discloses an embodiment of a system that includes multi-antennas in an extended space division.

FIG. 19 discloses an embodiment of a system that includes multi-antennas in an extended space division. The concept of the extended space division enabled by this multi-antenna solution is illustrated as such. The system may also include a plane W. The plane W may divide $H_3$ and $H_4$:

between the antennas $A_1$ and $A_3$. The plane Q may divide the 3D space around the antennas $A_1$ and $A_2$ into two half-spaces $H_1$ and $H_2$:

$H_1$ where $s_1 < s_2 : t_D > t_{DR}$
$H_2$ where $s_1 > s_2 : t_D < t_{DR}$
$H_3$ where $s_1 < s_3 : t_{D2} > t_{DR2}$
$H_4$ where $s_1 > s_3 : t_{D2} < t_{DR2}$ The reference receiver R maybe placed on the intersection between Q and W, as shown in the figure. The reference receiver R may be measuring $t_{DR1}$ and $t_{DR2}$. By receiving signals from both antenna combinations and evaluating $t_{D1}$ and $t_{D2}$, T can measure in which quarter space it is located and determine the crossings of the planes Q and W. The information which quarter spaces triggers an action for T can be embedded into the data part of the UWB message or communicated through a separate channel.

Figure 20:
FIG. 20 illustrates an example of a UWB packet sent through the transmit apparatus.

FIG. 20 illustrates an example of a UWB packet sent through the transmit apparatus. The UWB packet may include a UWB preamble field and an optional data payload. In an implementation where the transmission of a data payload as part of the UWB packet is not desired, the information can be sent through the secondary communication channel. The transmitter identifier may contain an identifier (source address) of the transmit apparatus. It may be used to differentiate between different transmit apparatus. For example, it may include a MAC address or some unique identifier as related to the apparatus. In one embodiment, the UWB preamble may be a requirement of information for the UWB packet.

Next, the UWB packet may include a packet type identifier that is used to differentiate packet payloads of several packet types. For example, the packet types may include (e.g. UWB TWR ranging packets) that are exchanged over the same channel. The UWB Packet may include within the UWB Data Payload a zone transition identifier indicates which zone transition (e.g $H_1->H_2$ or $H_2->H_1$) triggers an action on the receiver side. For example, the action may be to output an alert or send an instruction to cease operation of a vehicle or controller associated with a vehicle. The UWB data payload may also include an antenna pair identifier indicates which antenna pair (e.g $[A_1, A_2]$ or $[A_1, A_3]$) is used for the transmission of the packet. Thus, the system may be able to know what antenna has transmitted the packet based on the antenna pair identifier. In another embodiment, the UWB Data Payload may include a value $t_{DR}$ that may indicate the value of $t_D$, such as that in the reference plane(s) Q and W. Thus, this may be utilized to identify the delay of the signal. The $t_{DR}$ limits indicate the acceptable upper and lower limits for $t_{DR}$ in which the system is assumed to work correctly. When the delay is outside of the limits, a few different operations may occur. In one example, an error message may be broadcasted to identify the "timeout" or the system may try to rebroadcast the UWB packet. In another embodiment, the UWB Packet may include system timestamp that indicates the global system time when the packet is sent.

The UWB packet may also include a zone transition identifier indicates which zone transition (e.g. H1→H2 or H2→H1) triggers an action on the receiver side. Such an identifier of the zone transition is optional. Next, the UWB packet may include an antenna pair identifier. The antenna pair identifier indicates which antenna pair (e.g., [A1,A2] or [A1,A3]) may be used for the transmission of the packet. The reference value $t_{DR}$ may indicate the value of to in the reference plane Q. The $t_{DR}$ limits indicate the acceptable upper and lower limits for $t_{DR}$ in which the system is assumed to work correctly. The system timestamp indicates the global system time when the packet is sent. The timestamp may also be an optional payload field. Of course, other pay field options may be included that have information related to the UWB packet, transceiver, antenna, or other components.

Figure 21:
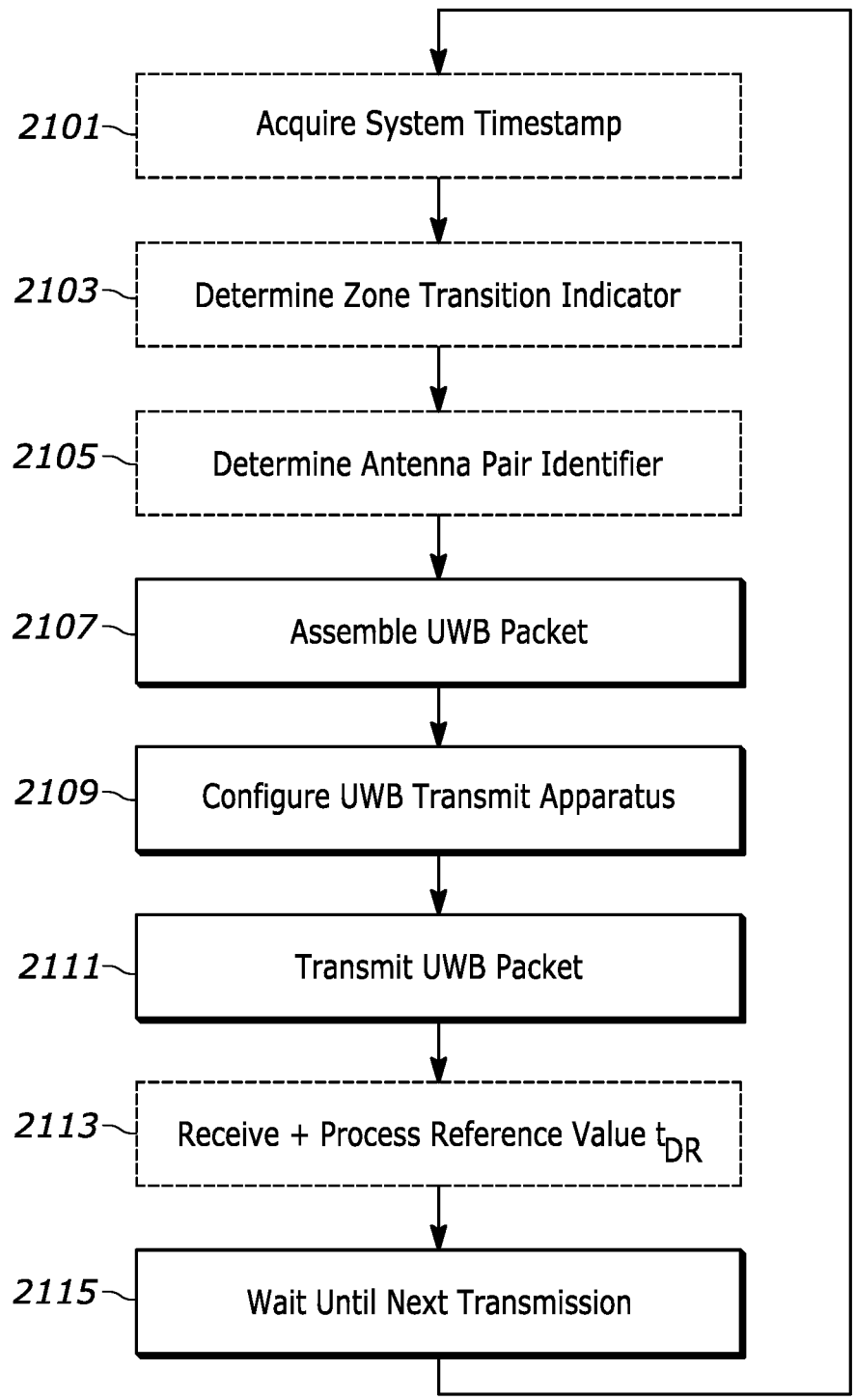
FIG. 21 illustrates a process flow inside of a UWB transmitter or transmit apparatus.

FIG. 21 illustrates a process flow inside of a UWB transmitter or transmit apparatus. At a first step 2101, the system may acquire a time stamp indicating the transmission time. In one example, the system may receive a process reference value of $t_{dr}$. At a second step 2103, the system may determine a zone transition indicator. At a third step 2105, the system may determine an antenna pair identifier to identify which antenna has been used or will transmit the data. As shown in the flow chart, the hyphenated steps may all be optional during transmission. Next, the system may assemble the UWB packet based on all of the information collected at step 2107. The UWB packet may be assembled with all or some of the information that was shown in FIG. 20. As mentioned, the UWB packet may include a preamble and other information related to various components or the transmission. At step 2109 the UWB transmit apparatus may be configured to prepare for transmission. Thus, the system may ensure that certain components are active and ready to transmit information. At step 2111, the UWB transmit apparatus may transmit the UWB packet. At step 2113, the system may receive and process a reference value of $t_{dr}$. At step 2115, the UWB transmit apparatus waits until the next scheduled transmission.

Figure 22:
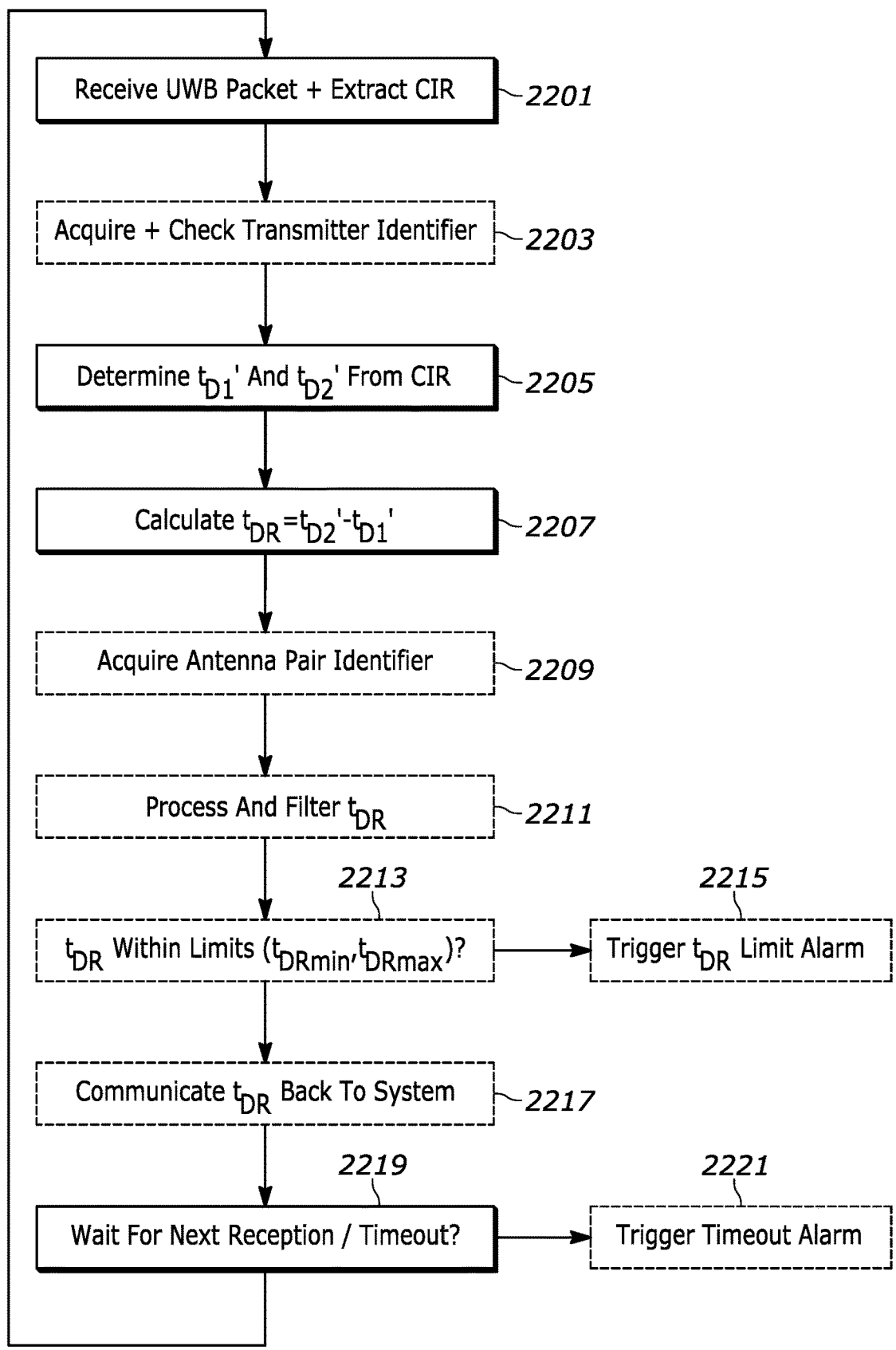
FIG. 22 illustrates the process flow inside a reference receiver positioned on the reference plane.

FIG. 22 illustrates the process flow inside a reference receiver R positioned on the reference plane Q. The reference receiver may implement three tasks in one embodiment. At step 2201, the system may receive a UWB packet and extract the CIR information from it. At step 2203, the system may quire and check a transmitter identifier. At 2205 the system may determine the relative arrival times $t_{D1}'$ and $t_{D2}'$ from the CIR information that was extracted. This can be accomplished a number of ways as discussed above. At step 2207, they system may have a first task that may be to include a step that may measure the reference value $t_{DR}$ for $t_D$ in the plane Q and communicate it back to the system, either through a UWB packet or through the secondary communication channel. The system may also alternatively acquire antenna pair identifier information at step 2209, or process and filter $t_{DR}$ at 2211. The filtering may allow for additional accuracy with respect to the reference value. At step 2213, the system may determine if $t_{DR}$ is within the boundary limits. If it falls out of the boundary limits, the system may output an alarm or notification at 2215. Thus, the system may monitor if the measured $t_{DR}$ is within the specified limits ($t_{DRmin}$, $t_{DRmax}$) and trigger an alarm if the limits are exceeded. Thus the system may monitor if packets from the transmit apparatus are received in a defined interval (timeout) and trigger an alarm if the limit is exceeded. At step 2217, the system may communicate $t_{DR}$ back to the system. At step 2219, the system may continue to monitor for the next reception or determine if a timeout has occurred. If a timeout has occurred, the system may output a timeout alarm trigger at 2221. In one alternative embodiment, R may act as a reference receiver for several UWB transmit apparatuses or a UWB transmit apparatus using multiple antenna pairs (see e.g., FIG. 18), the value tDR is measured, filtered, processed, and monitored for each transmitter/antenna pair independently.

Figure 23:
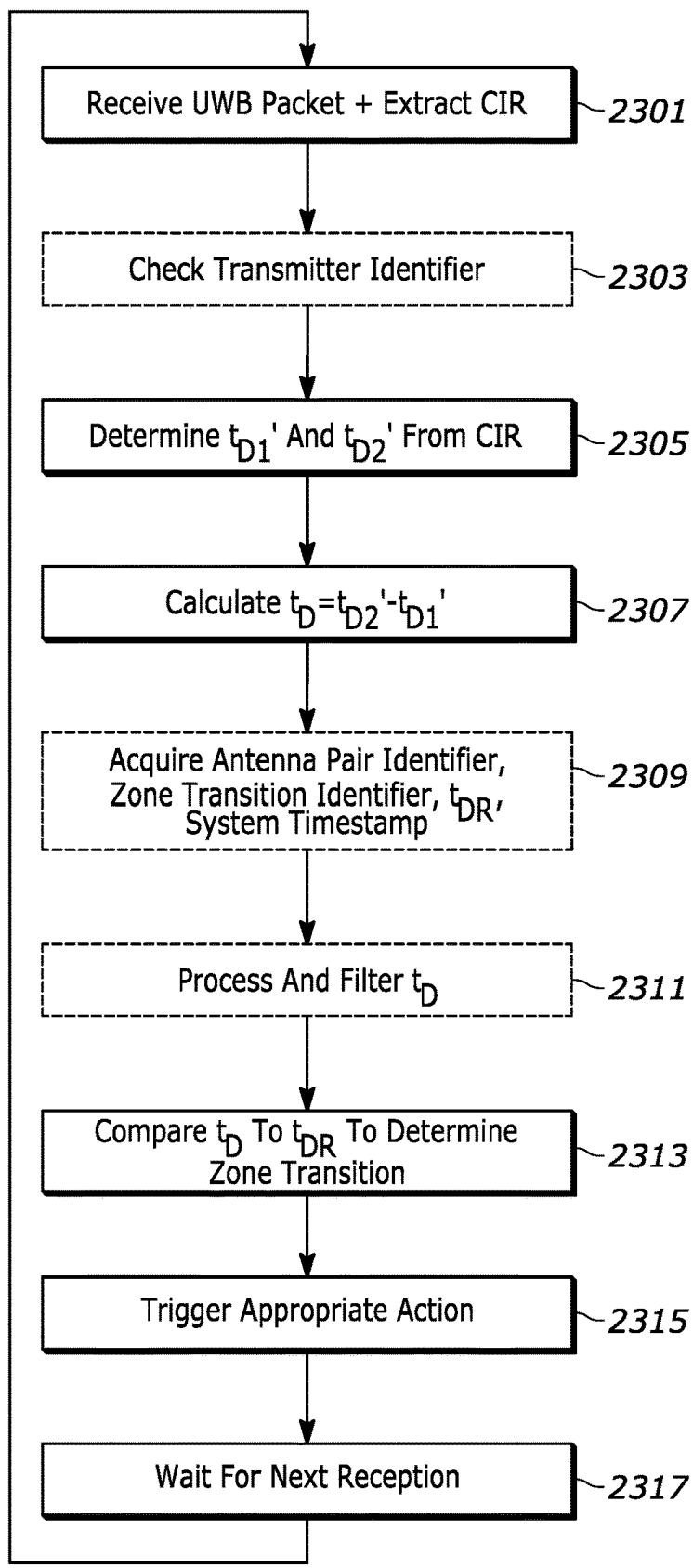
FIG. 23 illustrates the process flow inside a receiver in one embodiment.

FIG. 23 illustrates the process flow inside a receiver T in one embodiment. The information about the antenna pair identifier, zone transition identifier, and reference value $t_{DR}$ may be obtained through the data payload of the UWB packet received, through a secondary communication channel, and/or pre-configured values, etc. At step 2301, the system may receive a UWB packet and extract the CIR information from it. At step 2303, the system may acquire and check a transmitter identifier. At 2305 the system may determine the relative arrival times $t_{D1}'$ and $t_{D2}'$ from the CIR information that was extracted. This can be accomplished a number of ways as discussed above. At step 2307, they system may have a first task that may be to include a step that may measure the value $t_D$ and communicate it back to the system, either through a UWB packet or through the secondary communication channel. The system may also alternatively acquire antenna pair identifier information, zone transition identifier, or a system time stamp at step 2309. Again, alternatively, the system may process and filter $t_D$ at 2311. The filtering may allow for additional accuracy with respect to the reference value.

At step 2313, the system may compare reference value $t_{DR}$ and $t_D$ to determine if a zone transition has occurred (e.g., going from a certain zone to another). In an event where a zone transition occurs, various scenarios can happen. This may include the system making appropriate action at step 2315, such as triggering an alarm, activating/deactivating functionality (safe zone), logging the system timestamp at the transition time, and/or communication the event occurrence (and the timestamp) to the system, etc. Upon the action occurring, the system may then wait for the next reception at step 2317. In some embodiment, it may be beneficial to measure the geometric distance between antenna $A_1$ and T in addition to the zone determination events. This can be done by exchanging additional (targeted) UWB packets between the transmit apparatus and T.

Figure 24:
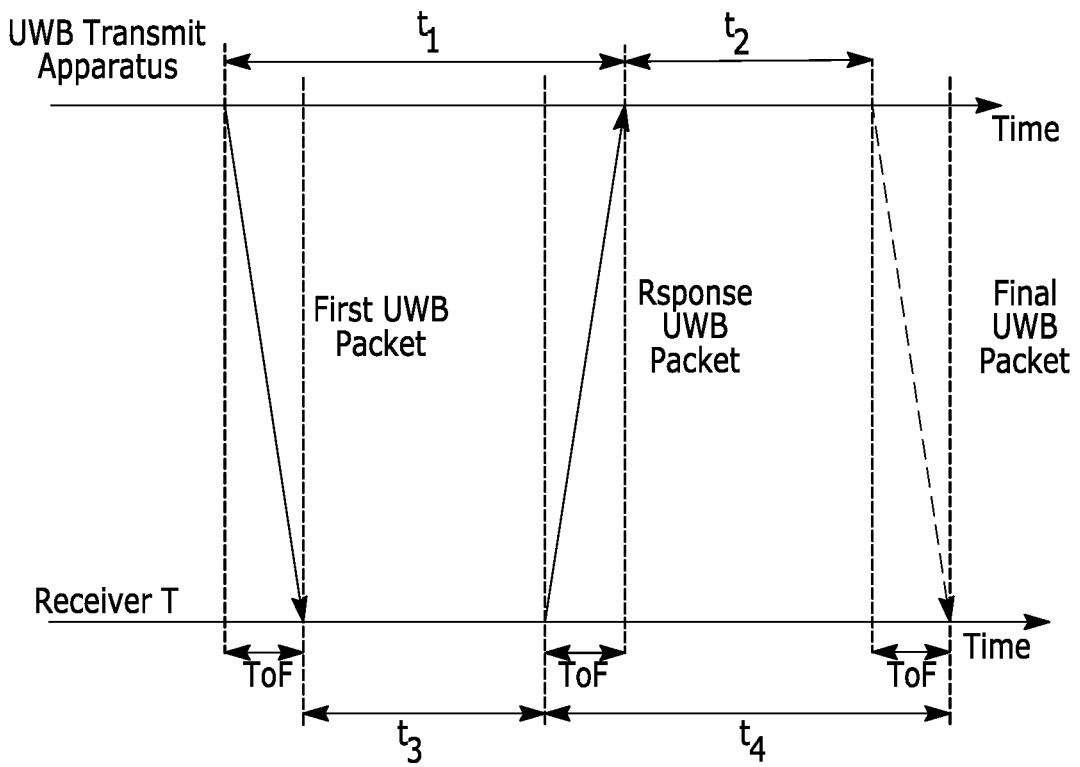
FIG. 24 illustrates the sequence of UWB packets in a ranging exchange.

FIG. 24 illustrates the sequence of UWB packets in a ranging exchange. The UWB ranging exchange may be used to measure the distance between the UWB transmit apparatus through the UWB signal's time-of-flight (ToF). In a single-sided two-way ranging exchange (SS-TWR), the UWB transmit apparatus (initiator) measures the time $t_1$ between the transmission of the first UWB packet and the receptions of the response UWB packet sent by T (responder). The transmit delay $t_3$ on T's side may be embedded into the response packet's data payload. From $t_1$, $t_3$ and the frequency offset between initiator and responder, UWB transmit apparatus (initiator) can calculate the time-of-flight and the geometric distance $s_1$ to the responder T. If the value of the distance s1 is also required on T's side, the concept can be extended by sending a third (final) UWB packet from the initiator to the responder, establishing a double-sided two-way ranging exchange (DS-TWR). Here T can calculate the ToF and distance from $t_3$ and $t_4$ measured locally and $t_1$, $t_2$ received in the payload of the final UWB packet. Through intelligent choice of the time delays $t_1$ and $t_2$ with $t_2 > t_1$ in the transmit apparatus (see, e.g., Error! Reference source not found.) it can be ensured that the signal emitted by antenna $A_1$ always arrives at T before the signal emitted by antenna $A_2$, independent of the position of T in space.

Figure 25:
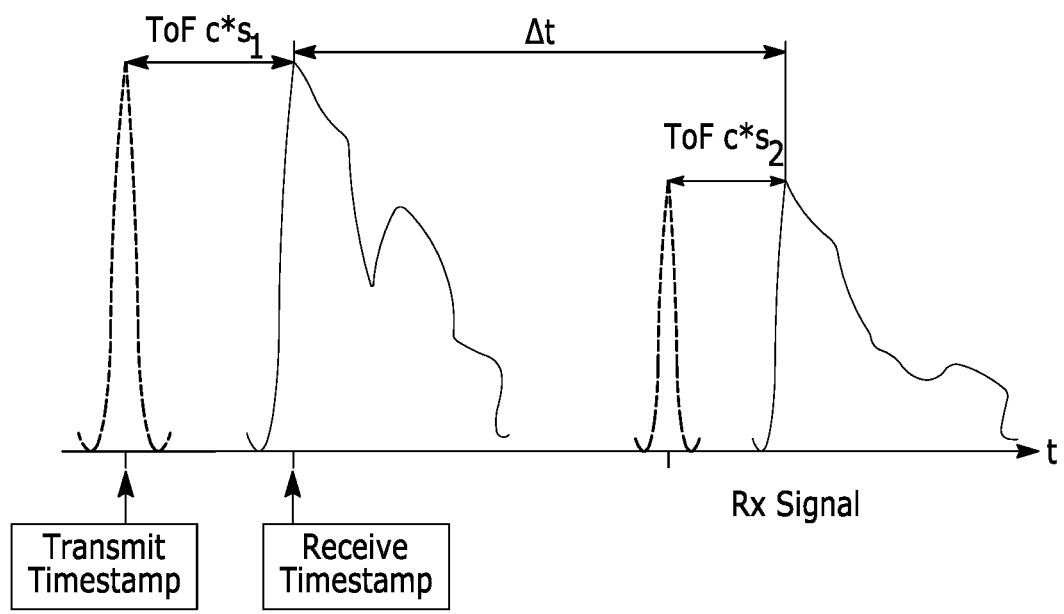
FIG. 25 illustrates an example of a transmit and receive time stamp.

FIG. 25 illustrates an example of a transmit and receive time stamp. As illustrated in Error! Reference source not found., the transmit timestamp of the UWB transmit apparatus may be defined by the signal leaving antenna A1. The receive timestamp is measured by T at the moment of the arrival of the first portion of the UWB signal at T, which is the signal from antenna $A_1$. A similar argument holds true for the timestamps of UWB packets sent by T back to the UWB transmit apparatus as part of the SS-TWR and DS-TWR ranging exchange. If the value of the distance $s_1$ is also required on T's side, the concept can be extended by sending a third (or final) UWB packet from the initiator to the responder, establishing a double-sided two-way ranging exchange (DS-TWR). Here T can calculate the ToF and distance from $t_3$ and $t_4$ measured locally and $t_1$, $t_2$ received in the payload of the final UWB packet.

Figure 26:
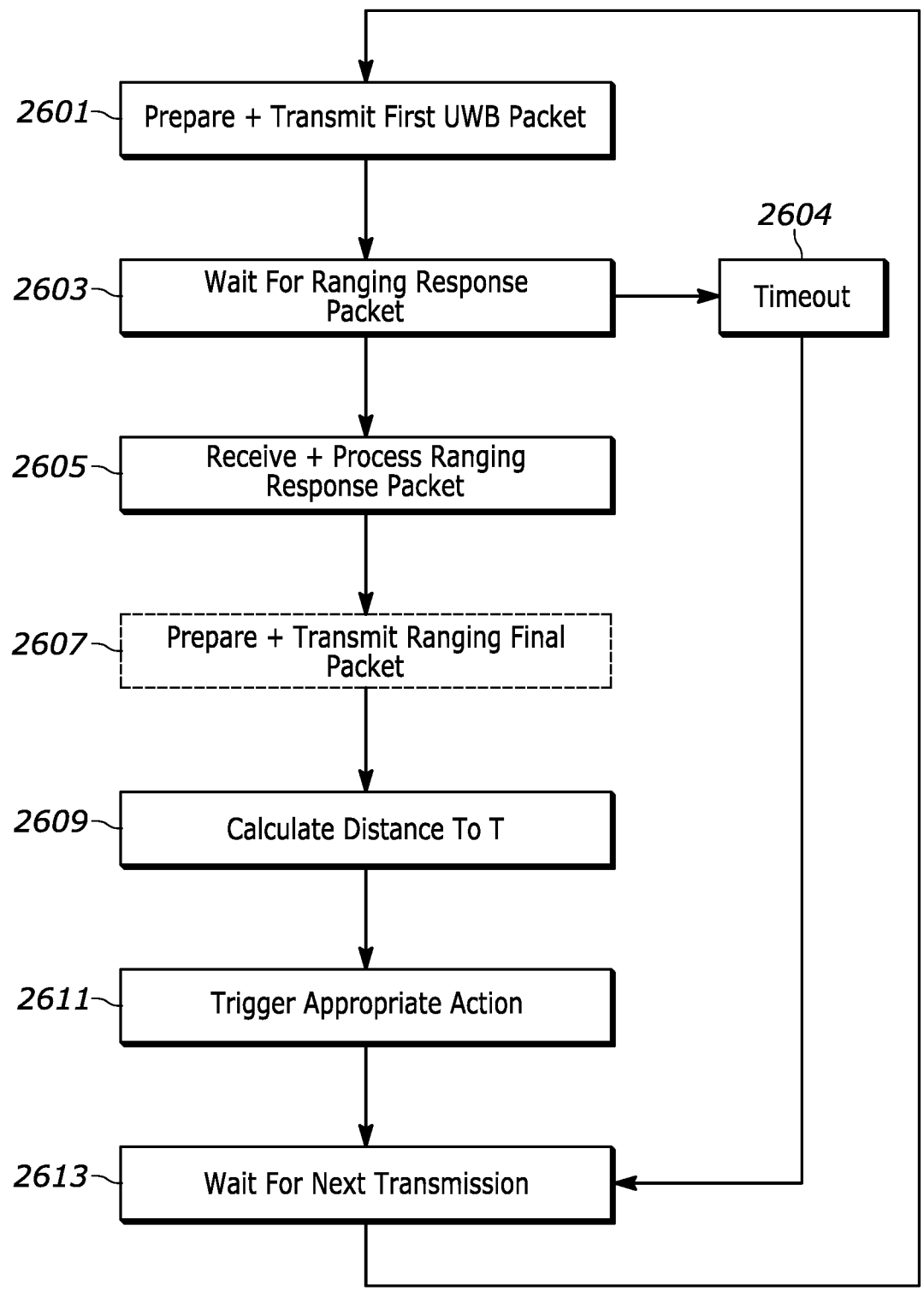
FIG. 26 illustrates a process flow for a UWB transmit apparatus with ranging.

FIG. 26 illustrates a process flow for a UWB transmit apparatus with ranging. At step 2601, the system may prepare and transmit a first UWB packet. The UWB packet may be sent by a transmitter. At step 2603, the system may wait for a ranging response packet. The system may have a pre-defined threshold time for a timeout (e.g., at step 2604) in case a response packet is never received. The timeout 2604 may occur based on various errors, and then the system may simply wait for a new transmission. If no packet is received, the TWR exchange failed and the Rx timeout may bring the system back to a defined state before the next round. At step 2605, the system may receive and process the ranging response packet. As mentioned above, the response packet may include information to help calculate a distance between the transmitter and responder. At step 2607, the system may prepare and transmit a third (or final packet) when a distance is required on the responder T's side. At step 2609, the system may calculate a distance to the responder utilizing the transmit and receive packet. At step 2611, the system may then trigger an appropriate action. At step 2613, the system may then wait for a next transmission and then lead to reprocessing such steps when initiated.

Figure 27:
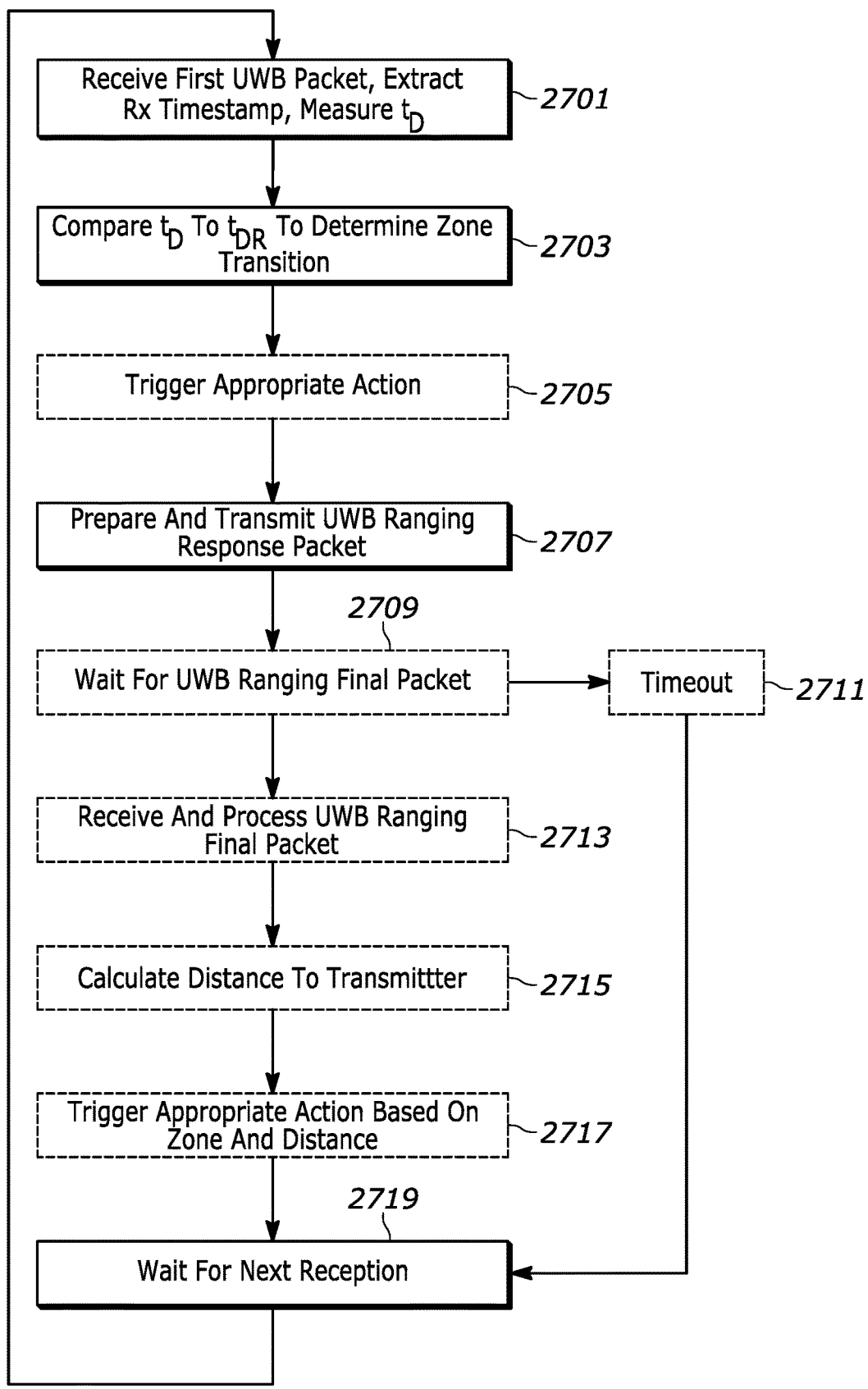
FIG. 27 illustrates a process flow for receiver/responder T with ranging.

FIG. 27 illustrates a process flow for a process flow for receiver/responder T with Ranging. At step 2701, the system may receive a first UWB packet. Upon receiving the UWB packet, the system may extract the Rx timestamp and measure tD. Next, the responder may compare tD to $t_{DR}$ to determine a zone transition. At step 2705, the system may trigger an appropriate action. Such an action may include outputting an alarm or similar notification. At step 2707, the system may prepare and transmit the UWB ranging response packet. At step 2709, the system may wait for the UWB ranging final packet and after a threshold period, may timeout 2711 if that threshold period is exceeded. The system may receive and process the UWB ranging final packet at 2713. At step 2715, the system may calculate a distance to the transmitter utilizing the various UWB packets and information. At step 2717, the system may trigger the appropriate action based on a zone that the tag T is located in. For example, if the tag T is in a safe zone, then operation may continue. However, the tag T is identified in a zone it is not supposed to be in, it may trigger an alarm. And at step 2719, the system may wait for the next reception and repeat the cycle to track the movement and actions of the tag.

Figure 28:
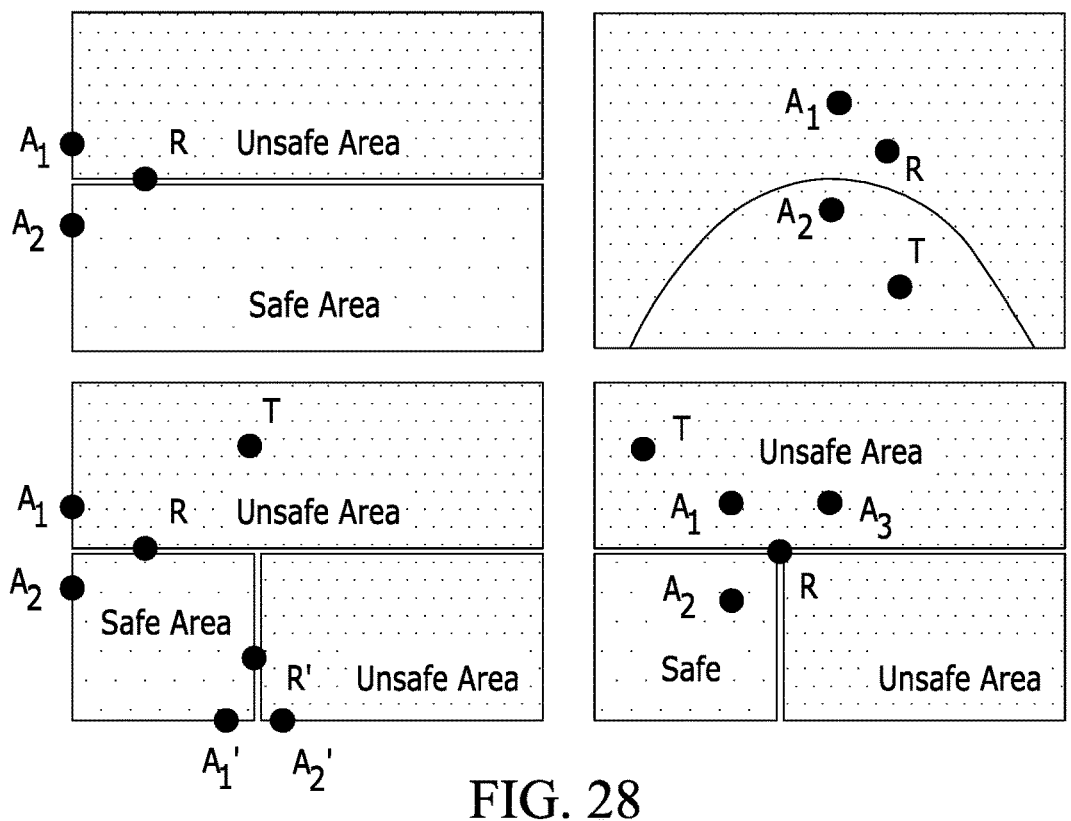
FIG. 28 discloses an example of applications for dividing a 3D space into various zones.

FIG. 28 discloses an example of applications for dividing a 3D space into various zones. The zones may include a "safe" zone or an "unsafe" zone. As such, the system described above can be implemented at low cost with existing commercially available components. For example, it may enable a transmitter or transceiver T or a fixed entity to determine the space $H_n$. The transmitter T maybe located in and the crossing of plane P or Q with decimeter level spatial precision and millisecond level time resolution in a 3D environment. The system may also work with any number of tags T, such as an unlimited number of tags T simultaneously. The system's operational status can be continuously monitored through reference receivers R.

The system and the methods described can be used for any application where the techniques and features described might be useful. In its most basic implementation, the system may include a UWB transceiver apparatus equipped with two antennas and one or several tags. If more functionalities are required, more complex implementations of the system can be utilized, as described above.

The zones of FIG. 28 may be divided into a 3D space for "safe" or "unsafe" areas. For example, with respect to the dividing of quadrants or planes in an area, an application related to "zoning" may apply. For example 'Safe zoning', geo-fencing and speed control for intralogistics applications may all be used. Timing, scoring and analytics for sports applications may also be utilized. This enables several applications. Enable/disable anti-collision warning tags for workers ('safe zone behind barrier'). Fast/slow speed control for forklifts when entering/leaving zone. Presence of persons/goods in defined zones.

The embodiments may be utilized for many examples, including forklifts. For example, where the forklifts passing intersections in logistics areas are specifically accident-prone locations. This example may be used to create an automatic 'slow-zone' for forklifts approaching the intersection. Forklift is forced to slow down when intersection zone is entered. Warning signals can be triggered. By setting the value for $t_{DR}$, the 'slow down fence' can be moved for both directions independently. 'Slow down zones' can be dynamically adjusted, e.g. when persons are present in the intersection.

Figure 29:
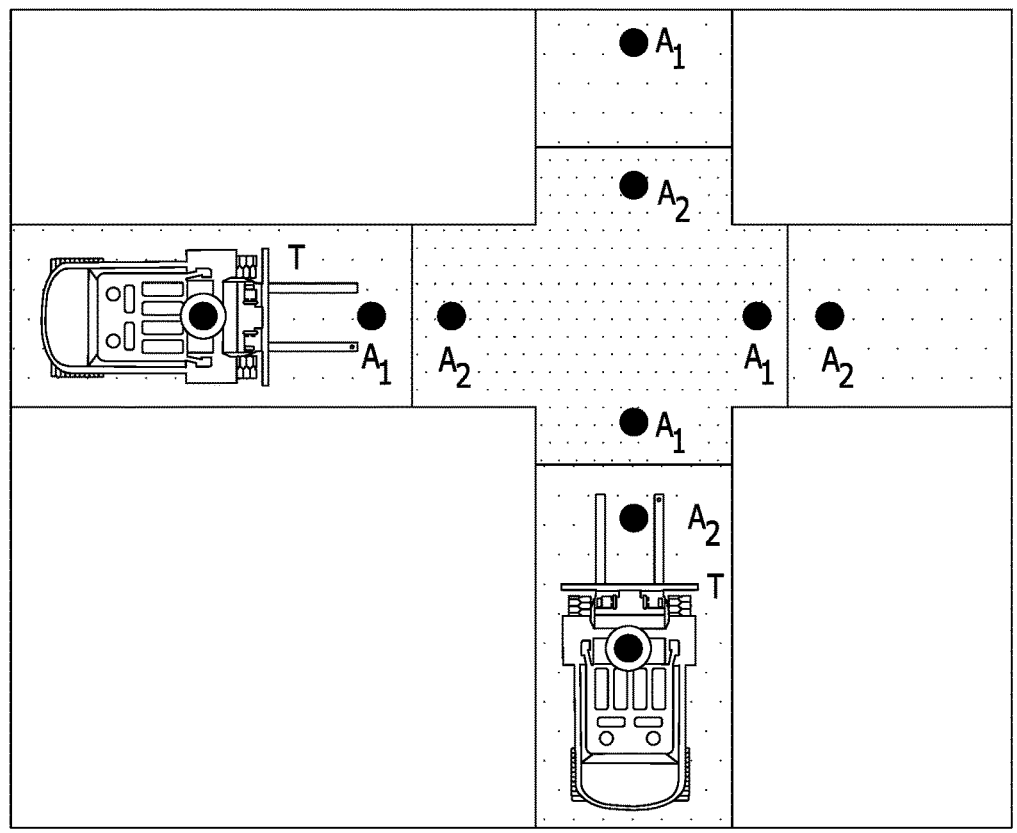
FIG. 29 illustrates another embodiment of zones that create a protected intersection.

FIG. 29 illustrates another embodiment where the zones may create a "protected intersection." Thus, tag T may be located on the fork lifts and notify an alarm if a forklift crosses into an intersection at a same time as another forklift (e.g., with a tag T). In another embodiment, a signal may be sent to execute instructions for autonomous or semi-autonomous driving of the forklift.

Figure 30:
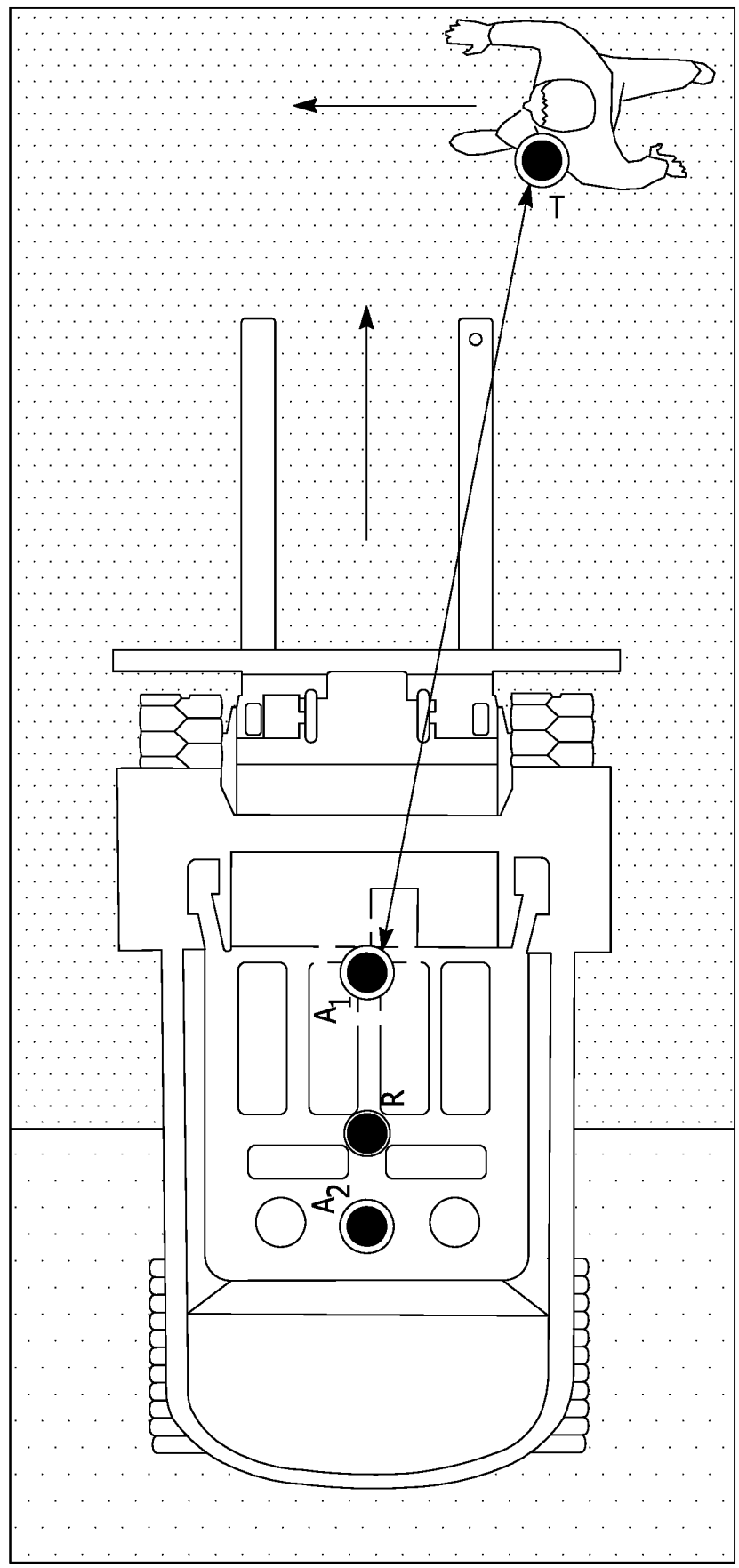
FIG. 30 illustrates an embodiment as related to a collision warning application.

FIG. 30 illustrates an embodiment as related to a collision warning application. In such an embodiment, it may be with respect to a worker and a forklift collision warning, however, any type of environment may be utilized. This may allow for an example for an advanced collision warning application. In such an example, tag T on a person can detect if it is located in front/behind the forklift utilizing the methods described above. In another example, the direction and speed of the forklift can be coded into the packet data payload, to allow for further accuracy and applications. By performing a TWR ranging exchange with $A_1$ (the signal from $A_1$ always arrives first), the distance to the forklift can be measured. In such an example, this information-combined with the zoning information and the direction and speed of travel can be used to dynamically adjust warning thresholds. Upon a warning occurring, a notification may be output or sent to a mobile device or another electronic device. The notification may include a display notification or a visual, haptic, or audible notification.

Figure 31:
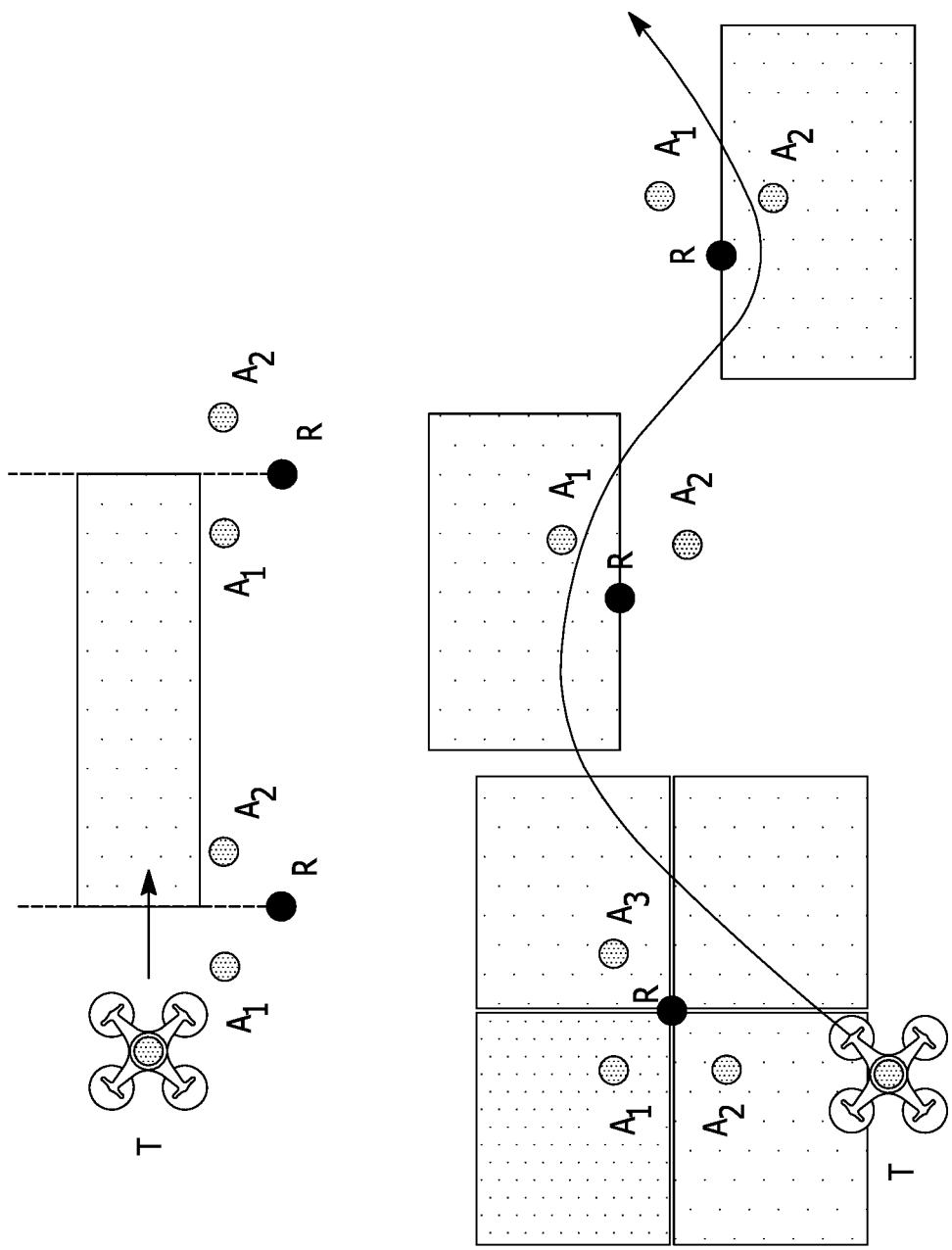
FIG. 31 illustrates an example embodiment for a sports application.

FIG. 31 illustrates an example embodiment for a sports application, such as a remote controlled drone. Other examples may include applications in the sports world. For example, in many sports, timing may be triggered, or a score/penalty is awarded when an entity, e.g., a competitor, a ball, or a remote-controlled vehicle crosses a plane or enters a zone. By using the system described, timing and scoring can be automated, reducing the need for human judges and improving the competition mitigating the 'human error' or taking it out of the equation.

The system (within range of the UWB signal) may work wirelessly in the 3D space. The tag T may be attached to the player/ball/drone (it may be any type of user or equipment, although a drone is shown as an example) may be low cost, can be miniaturized, and is battery powered. Millisecond precise timing information can be embedded in the payload of the UWB message, enabling very precise measurement when start-/finish lines are crossed in 3D space within the range of the UWB system (e.g., up to 40 m). For example, in tennis the tag T may be attached to a ball and may be utilized to call various line faults. While the tag T in the illustration lists a drone, any type of ball/puck/rocks/etc. may be utilized as explained.

Worldwide UWB radio regulations may prohibit UWB transmissions from airplanes, drones or similar devices in outdoor applications. The system described enables the tag to operate in 'UWB receive only' mode (UWB transmissions are initiated from temporary ground-based infrastructure only), making the implementation of a UWB technology for such applications possible. By performing a TWR ranging exchange with the various antennas (e.g., $A_1$, $A_2$, $A_3$,) (the signal from $A_1$ always arrives first), the distance to the drone/ball/or other object with tag T can be measured.

Figure 32:
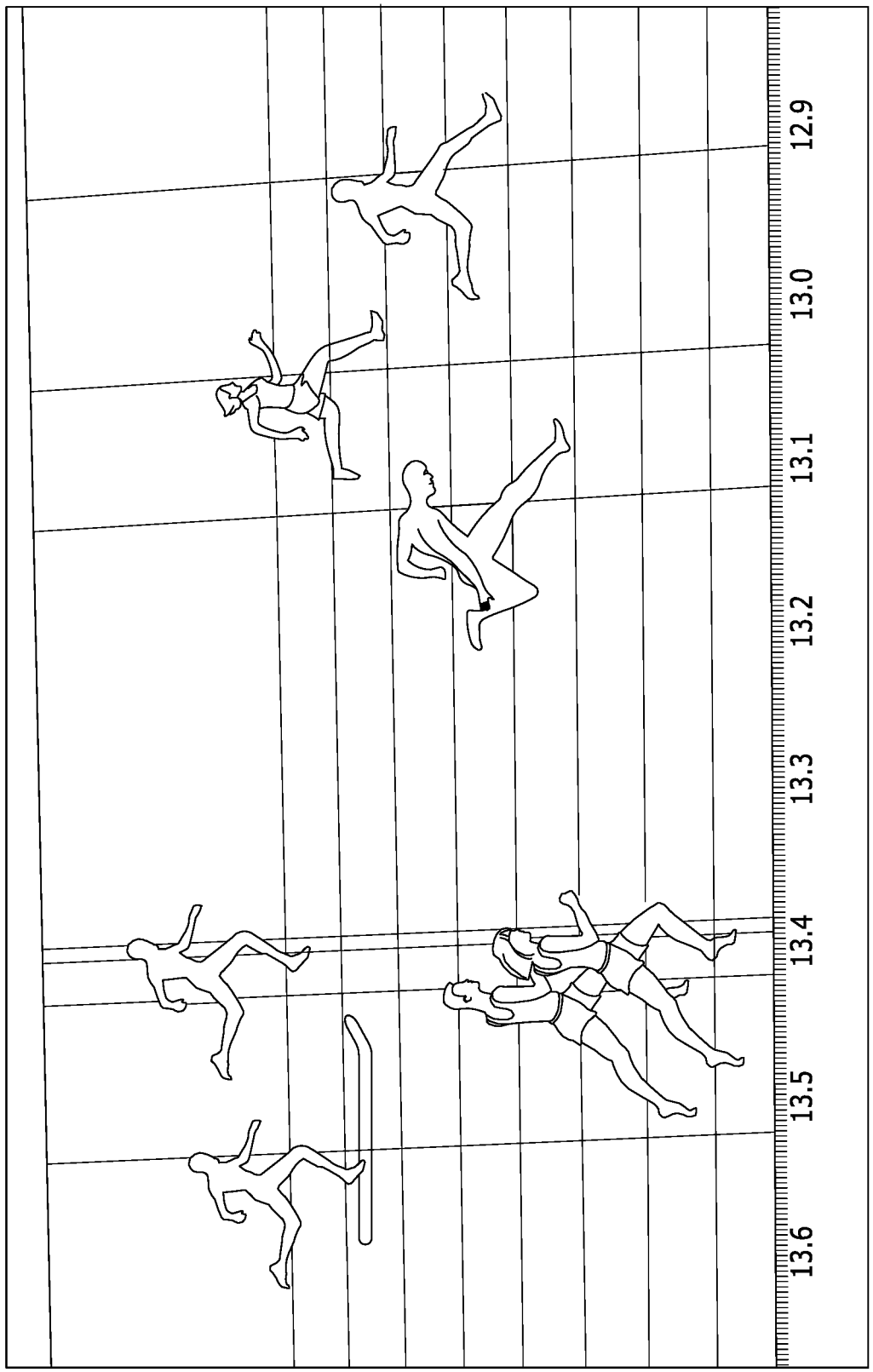
FIG. 32 illustrates an example embodiment for a sports application that includes a track-and-field event.

FIG. 32 illustrates an example embodiment for a sports applications, specifically a track and field running event. Other examples may include applications in a multitude of sports played. For example, in many sports, timing may be triggered, or a score/penalty is awarded when an entity, e.g., a competitor, a ball, or a remote-controlled vehicle crosses a plane or enters a zone. By using the system described, timing and scoring can be automated, reducing the need for human judges and improving the competition mitigating the 'human error' or taking it out of the equation.

The system (within range of the UWB signal) may work wirelessly in the 3D space. The tag T may be attached to the runner. Other examples may include a Tag being attached to a player/ball/drone (it may be any type of user or equipment, although a drone is shown as an example) may be low cost, can be miniaturized, and is battery powered. Millisecond precise timing information can be embedded in the payload of the UWB message, enabling very precise measurement when start-/finish lines are crossed in 3D space within the range of the UWB system (e.g., up to 40 m). For example, in tennis the tag T may be attached to a ball and may be utilized to call various line faults. As shown in FIG. 32, the system may utilize the tags to interact with the various transceivers to identify crossing times of a finish line. Timing gates may be employed.

In many sports, timing is triggered, or a score/penalty is awarded when a competitor, a ball, a puck, a remote-controlled vehicle, etc. crosses a plane or enters a zone. Traditionally, timing and scoring is performed by human umpires/judges by visually assessing the plane crossing/zone event. While this may works sufficiently well, when the accuracy of the timing determination required lies within human perception and reaction time capabilities (>0.1 s), the number of competitors to observe is limited (ideally one judge per competitor) and the visual event happens within a precisely defined line of sight.

Manual timing and scoring reach their limitations when timing accuracies better than 0.1 seconds are required. In such a scenario, automated electronic timing and scoring systems may be introduced. These may rely on automated, or computer supported detection of the start/finish event, e.g., the competitor/object crossing the start/finish line. Some examples of technology in these scenarios include high speed camera-based photo finish systems. If many competitors cross the start/finish line in rapid succession, the photo-finish approach may no longer be viable. In such a scenario, it may be optimal to utilize RFID proximity-based systems working with RFID tags fixed to the competitors and timing gates that are employed.

Figure 33:
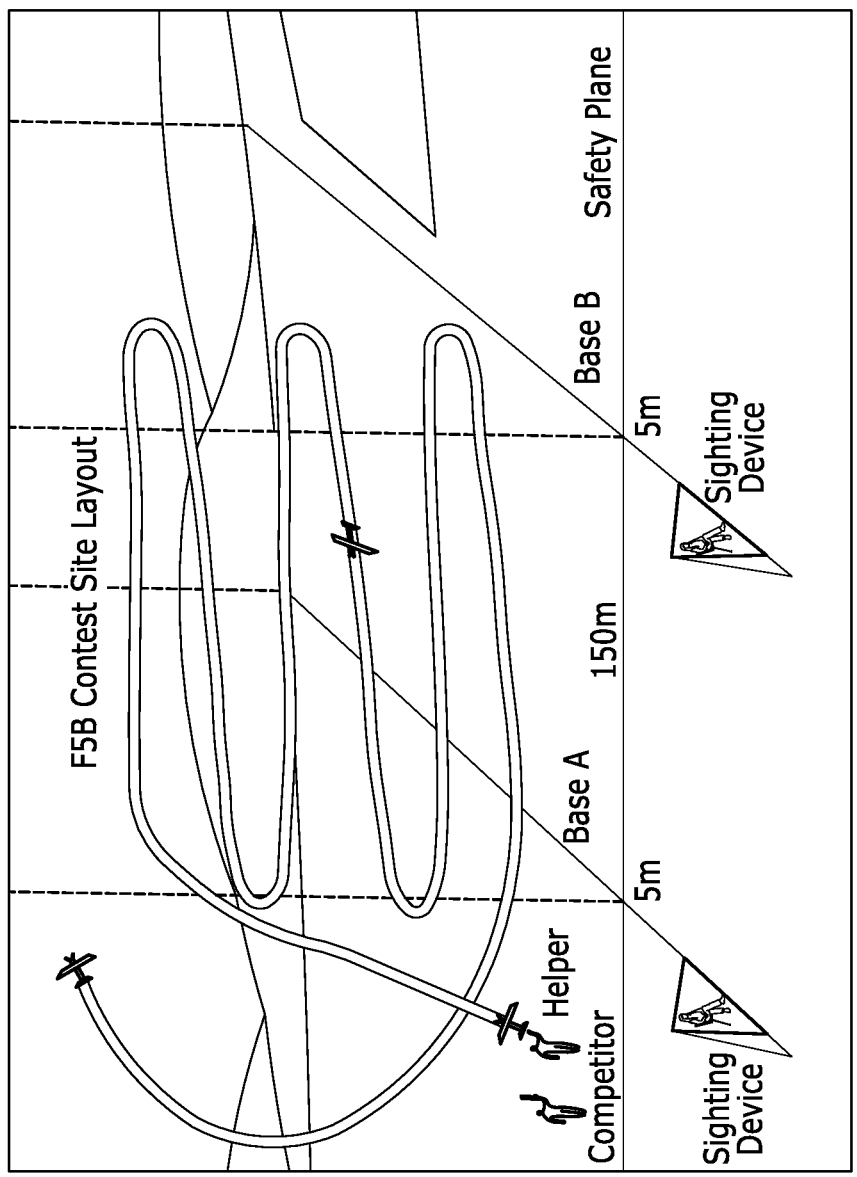
FIG. 33 illustrates an example embodiment utilized in aeromodelling class distance task.

FIG. 33 illustrates an example of an aeromodelling F5B class distance task utilizing an embodiment of the invention.

For sports disciplines operating in the 3D space, the situation may become more difficult, as the 'line crossing event' may become a '2d plane crossing event' in 3D space. This may be utilized in a distance task utilized in F5B aeromodelling competitions. In such a scenario, the competitor must steer a model airplane through a maximum number of legs between bases (e.g. a first base and a second base) in a fixed amount of time. Human judges may be faced with a task of detecting and signaling the plane crossing for these bases (e.g. base A and base B). Such challenges may occur for drone racing as well. In such a scenario, a tag T may be placed on the plane as it crosses a base equipped with a UWB transceiver. For example, Base A and Base B may be equipped with transceivers to be notified when the plane (equipped with a TAG) crosses the path. Various landing circles may also be equipped with such UWB transceivers. Thus when the plane crosses the various gates or finish lines, landing strips, etc., the UWB signals may be utilized to precisely identify entrance/exiting of the various "zones" as related to the aeromodelling race.

Figure 34:
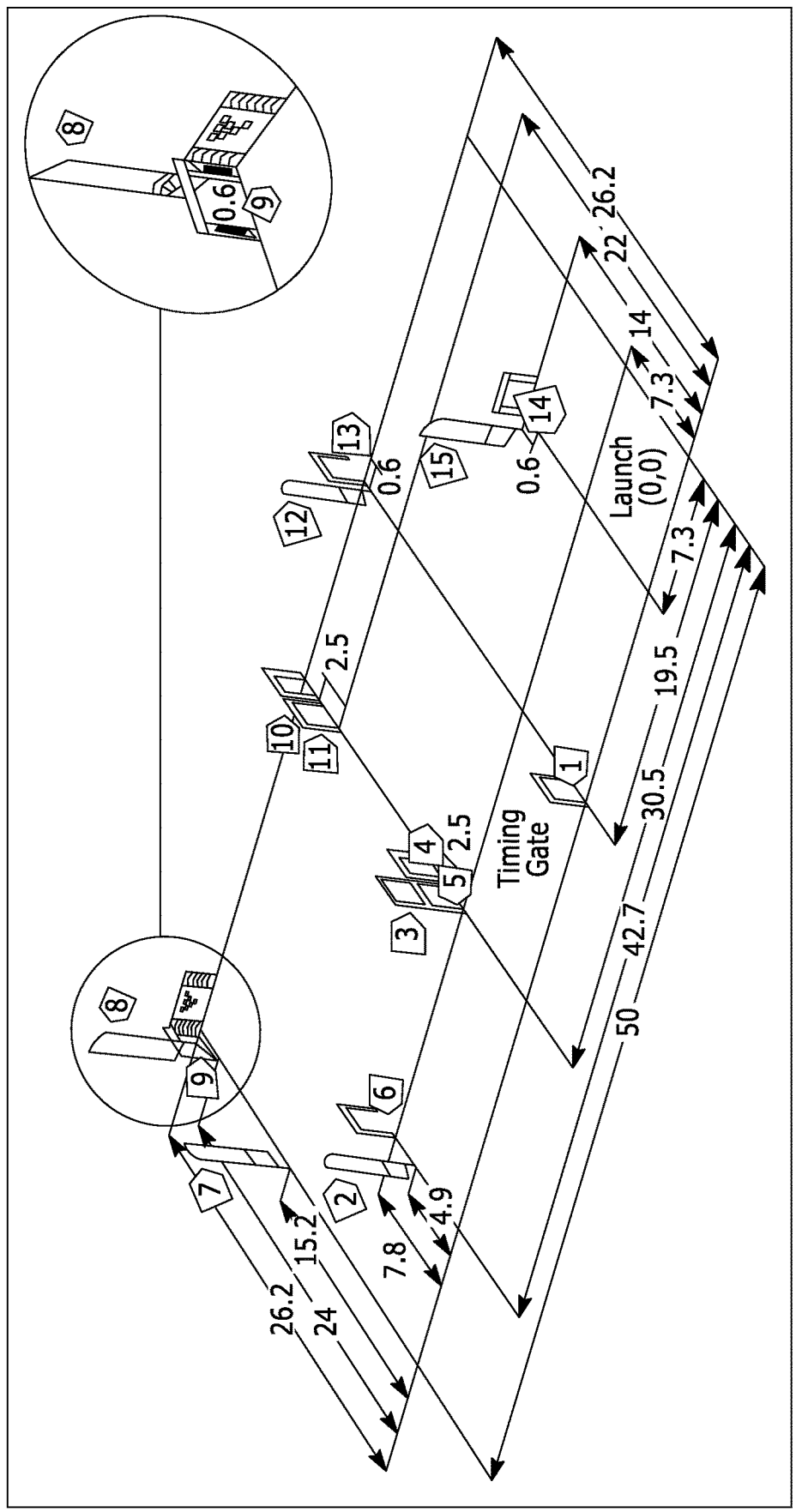
FIG. 34 illustrates an embodiment including a timing gate for a multi-copter racing track.

FIG. 34 illustrates a timing gate for a multi-copter racing track. Various drones or copters may be equipped with a Tag T that interacts with a UWB transceiver attached to various gates, a start line, and a finish line. Worldwide UWB radio regulations may prohibit UWB transmissions from airplanes, drones or similar devices in outdoor applications. The system described enables the tag T to operate in 'UWB receive only' mode (UWB transmissions are initiated from temporary ground-based infrastructure only), making the implementation of a UWB technology for such applications possible.

To enable future autonomous operation of vertical takeoff and landing (VTOL) unmanned aerial vehicles (multi-copter UAVs), automatic and reliable automatic landing capability is crucial. Coarse navigation to the landing target area is typically achieved by a satellite based (GNSS) and/or inertial navigation system, but the accuracy of the GNSS/INS system is in many cases not sufficient to enable precise landings in the target area reliably. Thus, a secondary system may be used for this task. Published approaches are based on a downward facing camera detecting a visual fiducial on the landing target point. This technique reaches its limits under low visibility or low illumination conditions. Employing UWB technology for this task can overcome this limitation. UWB radio regulations in jurisdictions may prohibit the emission of UWB signals from UAVs. The system described in an illustrative embodiment may enable the UAV to navigate to its landing position by passive reception of UWB signals only, which legally enables the use of UWB technology for these applications.

Figure 35:
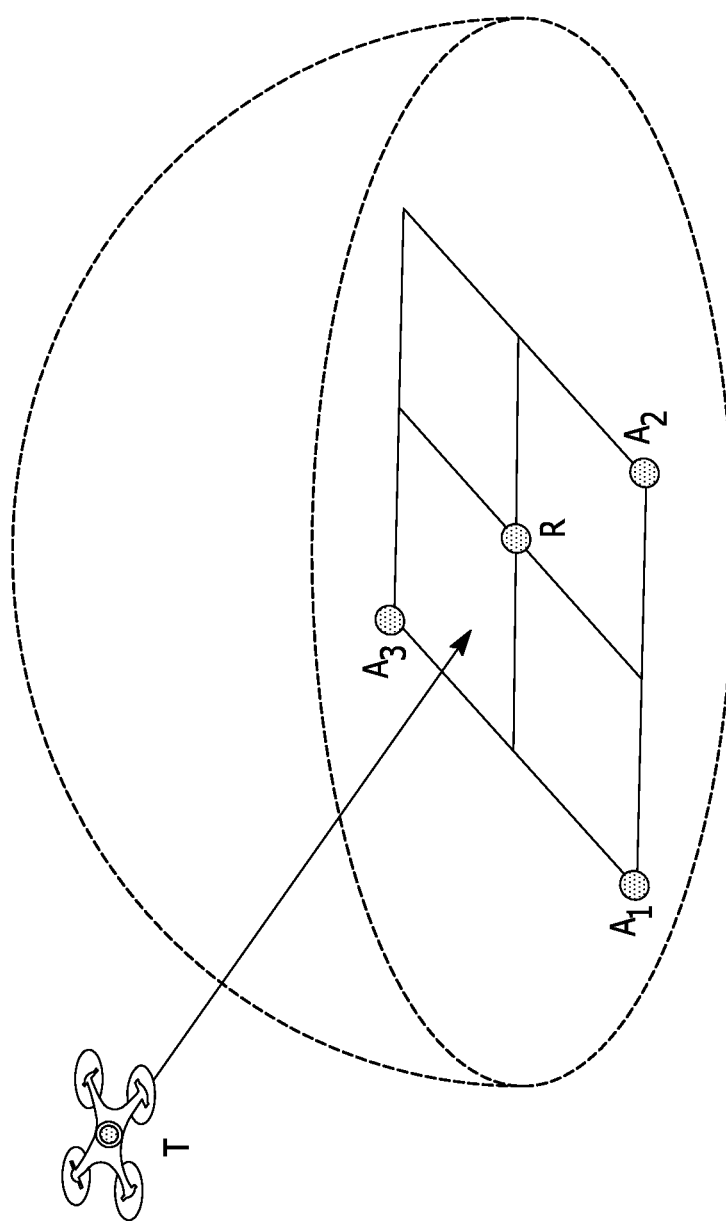
FIG. 35 illustrates an embodiment including a landing guidance system for a Unmanned Aerial vehicle (UAV).

FIG. 35 illustrates an illustrative embodiment of a landing guidance system for a UAV. The UAV may be equipped with a location transceiver, such as a coarse navigation system (GNSS, IMU, etc.) to fly towards a landing zone. The landing zone may be within the radio range of the UWB transmit apparatus. A receiver may be attached to the UAV and connected to the UAV's control system. By constantly measuring $t_D$ for the UWB signals received from the antenna pairs A1, A2 and A1, A3 positioned on a horizontal plane, and comparing it to $t_{DR}$ for each of the antenna pairs. This provides, a measure of lateral offset to the landing target position (position of the (optional) reference receiver R) and serve as a control input for the UAVs guidance system. During this process, the UAV can remain in receive-only mode, not producing any RF emissions.

In its most basic form, this system does not provide a measure for the altitude of the UAV over the landing plane, only a (non-linear) measure of the lateral offset. The altitude information can be acquired by a secondary sensor system (e.g. a barometric altimeter or a LIDAR sensor) or through additional UWB two-way ranging.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system including:
one or more ultra-wideband (UWB) transmit apparatuses configured to communicate a plurality of UWB signals via two or more antennas associated with the UWB transmit apparatuses, wherein the plurality of UWB signals encode radio packets that includes at least a preamble and a start frame delimiter (SFD) enabling a receiver to recover a reception timestamp and a channel impulse response (CIR) of the transmission, wherein the one or more UWB transmit apparatuses are located in a fixed position and configured to divide a space into a plurality of subspaces configured to be assigned an attribute associated with each of the subspaces utilizing the plurality of UWB signals and one or more distances between the two or more antennas associated with the UWB transmit apparatuses, wherein the plurality of UWB signals includes two or more split signals that are a coherent copy of one another from a master UWB signal; and
one or more UWB receivers configured to extract CIR information from the one or more radio packets received from a UWB transceiver, and trigger an event in response to a determination of the receiver being either (i) located in one of a plurality of subspaces, or (ii) leaving or entering the one of the plurality of subspaces, wherein the determination is made utilizing at least the CIR information.

2. The system of claim 1, wherein the one of the plurality of subspaces is associated with a hazard zone, wherein the trigger event is triggered in response to the receiver being in the hazard zone.

3. The system of claim 1, wherein first subspace is associated with a playing field and a second subspace is associated with a hazard zone.

4. The system of claim 1, wherein the one or more ultra-wideband (UWB) apparatus are attached to and moving with a vehicle.

5. The system of claim 1, wherein plurality of subspaces includes a three-dimensional subspace.

6. The system of claim 1, wherein the space includes a two-dimensional space.

7. The system of claim 1, wherein the UWB receiver is fixed.

8. The system of claim 1, wherein the UWB receiver is mobile.

9. A system including:
one or more ultra-wideband (UWB) transmit apparatuses including a transceiver configured to communicate a plurality of UWB signals via two or more antennas associated with the UWB transmit apparatuses, wherein the plurality of UWB signals encode radio packets that enables at least a receiver to recover a channel impulse response of transmission of the UWB signal, wherein the one or more UWB transmit apparatuses are located in a fixed position and configured to divide a space into a plurality of subspaces configured to be assigned an attribute associated with each of the subspaces utilizing the UWB signal and one or more distances between two or more antennas associated with the UWB transmit apparatuses, wherein the plurality of UWB signals includes two or more split signals that are a coherent copy of one another from a master UWB signal; including:
one or more UWB receivers configured to extract CIR information from the one or more radio packets received from a UWB transceiver, and trigger an event in response to a determination of the receiver being either located in or leaving a first subspace, wherein the determination is made utilizing at least the CIR information.

10. The system of claim 9, wherein the UWB signal that encodes radio packets that includes at least a preamble and a start frame delimiter (SFD) enabling a receiver to recover a reception timestamp and a channel impulse response (CIR) of the transmission.

11. The system of claim 9, wherein the event includes outputting an alarm or notification.

12. The system of claim 9, wherein the event includes reducing speed of a vehicle associated with the UWB transmit apparatuses.

13. The system of claim 9, wherein the one or more UWB receivers are mobile and the one or more UWB transmit apparatuses are fixed.

14. A system including:
one or more ultra-wideband (UWB) transmit apparatuses including a transceiver configured to communicate signals via two or more antennas associated with the UWB transmit apparatuses, wherein the plurality of UWB signals encode radio packets that enables at least a receiver to obtain a channel impulse response of transmission of the UWB signal, wherein the one or more UWB transmit apparatuses are located in a position and configured to divide a space into a plurality of subspaces configured to be assigned an attribute associated with each of the subspaces utilizing the UWB signal and one or more distances between two or more antennas associated with the UWB transmit apparatuses, wherein the plurality of UWB signals includes two or more split signals that are a coherent copy of one another from a master UWB signal; including:
one or more UWB receivers configured to extract CIR information from the one or more radio packets received from a UWB transceiver, and trigger an event in response to a determination of the receiver entering or leaving a one of the subspaces of the plurality of subspaces, wherein the determination is made utilizing at least the CIR information.

15. The system of claim 14, wherein the position is a fixed position on an object.

16. The system of claim 14, wherein the one or more UWB receivers are each fixed.

17. The system of claim 14, wherein the one or more UWB receivers are each mobile.

18. The system of claim 14, wherein the event includes awarding or penalizing a score, or starting or stopping a timer.

19. The system of claim 14, wherein the one or more UWB transmit apparatuses are associated with a flying vehicle.

20. The system of claim 14, wherein the plurality of subspaces includes at least a finish line or a start line.

* * * * *